(12) United States Patent
Paladugu et al.

(10) Patent No.: US 11,564,280 B2
(45) Date of Patent: Jan. 24, 2023

(54) USER EQUIPMENT TO NETWORK RELAY

(71) Applicant: QUALCOMM Incorporated, San Diego, CA (US)

(72) Inventors: Karthika Paladugu, San Diego, CA (US); Hong Cheng, Basking Ridge, NJ (US); Gavin Bernard Horn, La Jolla, CA (US); Seyedkianoush Hosseini, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/135,431

(22) Filed: Dec. 28, 2020

(65) Prior Publication Data

US 2021/0212151 A1 Jul. 8, 2021

Related U.S. Application Data

(60) Provisional application No. 62/956,965, filed on Jan. 3, 2020.

(51) Int. Cl.
*H04W 76/27* (2018.01)
*H04W 76/28* (2018.01)
(Continued)

(52) U.S. Cl.
CPC ........... *H04W 76/27* (2018.02); *H04W 76/14* (2018.02); *H04W 76/28* (2018.02); *H04W 92/18* (2013.01)

(58) Field of Classification Search
CPC ........ H04B 7/15; H04B 7/15535–1555; H04B 7/15528–1555; H04W 76/10;
(Continued)

(56) References Cited

U.S. PATENT DOCUMENTS 10,257,677 B2  4/2019  Baghel et al.
2016/0212682 A1  7/2016  Chung et al.
(Continued)

FOREIGN PATENT DOCUMENTS

EP  3162105 A1  5/2017
EP  3248352 A1  11/2017
(Continued)

OTHER PUBLICATIONS

ERICSSON: "Tentative conclusions for ProSe UE-to-Network Relays", 3GPP Draft, S2-134030, SA WG2 Meeting #100, UE-TO-NW Relays, 3rd Generation Partnership Project (3GPP), Mobile Competence Centre, 650, Route Des Lucioles, F-06921 Sophia-Antipolis Cedex, France, vol. SA WG2. No. San Francisco, USA, Nov. 11, 2013-Nov. 15, 2013, Nov. 12, 2013 (Nov. 12, 2013), XP050744094, 8 Pages, Retrieved from the Internet: URL: http://www.3gpp.org/ftp/Meetings_3GPP_SYNC/SA/SA2/Docs/. [retrieved on Nov. 12, 2013] paragraph [0003].
(Continued)

*Primary Examiner* — Thomas R Cairns
(74) *Attorney, Agent, or Firm* — Arun Swain; Harrity & Harrity, LLP

(57) ABSTRACT

Various aspects of the present disclosure generally relate to wireless communication. In some aspects, a remote user equipment (UE) may communicate with a network entity via a relay UE using one or more radio resource control (RRC) messages that are encapsulated in a dedicated sidelink signaling message directed to the relay UE. The UE may receive, from the network entity via the one or more RRC messages, an access stratum configuration for a sidelink unicast link between the remote UE and the relay UE. The UE may configure the sidelink unicast link based at least in part on the received access stratum configuration. Numerous other aspects are described.

30 Claims, 22 Drawing Sheets

(51) Int. Cl.
*H04W 76/14* (2018.01)
*H04W 92/18* (2009.01)

(58) Field of Classification Search
CPC ... H04W 76/14; H04W 76/28; H04W 84/047; H04W 88/04; H04W 92/18; H04W 8/005; H04W 16/26; H04W 36/0083; H04W 52/02; H04W 76/27; H04W 87/18
See application file for complete search history.

(56) References Cited

U.S. PATENT DOCUMENTS

2018/0020442 A1    1/2018  Nair
2020/0100088 A1*   3/2020  Kim ................... H04W 48/16
2021/0345356 A1*  11/2021  Fan ................... H04W 72/087

FOREIGN PATENT DOCUMENTS

GB        2548374 A    9/2017
WO        2017065895   4/2017

OTHER PUBLICATIONS

International Search Report and Written Opinion—PCT/US2020/067277—ISA/EPO—dated Mar. 29, 2021.

* cited by examiner

USER EQUIPMENT TO NETWORK RELAY

CROSS-REFERENCE TO RELATED APPLICATION

This patent application claims priority to U.S. Provisional Patent Application No. 62/956,965, filed on Jan. 3, 2020, entitled "LAYER 2 USER EQUIPMENT-TO-NETWORK RELAY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a user equipment to network relay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a remote user equipment (UE) includes communicating with a network entity via a relay UE using one or more radio resource control (RRC) messages that are encapsulated in a dedicated sidelink signaling message directed to the relay UE; receiving, from the network entity via the one or more RRC messages, an access stratum configuration for a sidelink unicast link between the remote UE and the relay UE; and configuring the sidelink unicast link based at least in part on the received access stratum configuration.

In some aspects, a method of wireless communication performed by a relay user equipment (UE) includes establishing a sidelink unicast link with a remote UE using one or more sidelink signaling messages; relaying a communication, received from the remote UE on a unicast sidelink interface, using one or more radio resource control (RRC) messages that are encapsulated in a sidelink signaling message; receiving, from a network entity via an RRC message, an access stratum configuration for a unicast sidelink interface between the remote UE and the relay UE; and modifying the sidelink unicast link between the UE and the relay UE based at least in part on the received access stratum configuration.

In some aspects, a method of wireless communication performed by a network entity includes communicating with a remote user equipment (UE) via a relay UE using one or more radio resource control (RRC) messages that are encapsulated in a dedicated sidelink signaling message directed to the relay UE, wherein the one or more RRC messages include an access stratum configuration for one or more sidelink interface radio bearers between the relay UE and the remote UE; and receiving a communication from the remote UE via the relay UE based at least in part on the access stratum configuration.

In some aspects, a remote user equipment (UE) for wireless communication includes a memory; and one or more processors operatively coupled to the memory, the memory and the one or more processors configured to: communicate with a network entity via a relay UE using one or more radio resource control (RRC) messages that are encapsulated in a dedicated sidelink signaling message directed to the relay UE; receive, from the network entity via the one or more RRC messages, an access stratum configuration for a sidelink unicast link between the remote UE and the relay UE; and configure the sidelink unicast link based at least in part on the received access stratum configuration.

In some aspects, a relay user equipment (UE) for wireless communication includes a memory; and one or more processors operatively coupled to the memory, the memory and the one or more processors configured to: establish a sidelink unicast link with a remote UE using one or more sidelink signaling messages; relay a communication, received from the remote UE on a unicast sidelink interface, using one or more radio resource control (RRC) messages that are encapsulated in a sidelink signaling message; receive, from a network entity via an RRC message, an access stratum configuration for a unicast sidelink interface between the remote UE and the relay UE; and modify the sidelink unicast link between the UE and the relay UE based at least in part on the received access stratum configuration.

In some aspects, a network entity for wireless communication includes a memory; and one or more processors operatively coupled to the memory, the memory and the one or more processors configured to: communicate with a remote user equipment (UE) via a relay UE using one or more radio resource control (RRC) messages that are encapsulated in a dedicated sidelink signaling message directed to the relay UE, wherein the one or more RRC messages include an access stratum configuration for one or more sidelink interface radio bearers between the relay UE and the remote UE; and receive a communication from the remote UE via the relay UE based at least in part on the access stratum configuration.

In some aspects, a non-transitory computer-readable medium storing a set of instructions for wireless communication includes one or more instructions that, when executed by one or more processors of a remote user equipment (UE), cause the UE to: communicate with a network entity via a relay UE using one or more radio resource control (RRC) messages that are encapsulated in a dedicated sidelink signaling message directed to the relay UE; receive, from the network entity via the one or more RRC messages, an access stratum configuration for a sidelink unicast link between the remote UE and the relay UE; and configure the sidelink unicast link based at least in part on the received access stratum configuration.

In some aspects, a non-transitory computer-readable medium storing a set of instructions for wireless communication includes one or more instructions that, when executed by one or more processors of a relay user equipment (UE), cause the UE to: establish a sidelink unicast link with a remote UE using one or more sidelink signaling messages; relay a communication, received from the remote UE on a unicast sidelink interface, using one or more radio resource control (RRC) messages that are encapsulated in a sidelink signaling message; receive, from a network entity via an RRC message, an access stratum configuration for a unicast sidelink interface between the remote UE and the relay UE; and modify the sidelink unicast link between the UE and the relay UE based at least in part on the received access stratum configuration.

In some aspects, a non-transitory computer-readable medium storing a set of instructions for wireless communication includes one or more instructions that, when executed by one or more processors of a network entity, cause the network entity to: communicate with a remote user equipment (UE) via a relay UE using one or more radio resource control (RRC) messages that are encapsulated in a dedicated sidelink signaling message directed to the relay UE, wherein the one or more RRC messages include an access stratum configuration for one or more sidelink interface radio bearers between the relay UE and the remote UE; and receive a communication from the remote UE via the relay UE based at least in part on the access stratum configuration.

In some aspects, an apparatus for wireless communication includes means for communicating with a network entity via a relay UE using one or more radio resource control (RRC) messages that are encapsulated in a dedicated sidelink signaling message directed to the relay UE; means for receiving, from the network entity via the one or more RRC messages, an access stratum configuration for a sidelink unicast link between the remote UE and the relay UE; and means for configuring the sidelink unicast link based at least in part on the received access stratum configuration.

In some aspects, an apparatus for wireless communication includes means for establishing a sidelink unicast link with a remote UE using one or more sidelink signaling messages; means for relaying a communication, received from the remote UE on a unicast sidelink interface, using one or more radio resource control (RRC) messages that are encapsulated in a sidelink signaling message; means for receiving, from a network entity via an RRC message, an access stratum configuration for a unicast sidelink interface between the remote UE and the relay UE; and means for modifying the sidelink unicast link between the UE and the relay UE based at least in part on the received access stratum configuration.

In some aspects, an apparatus for wireless communication includes means for communicating with a remote user equipment (UE) via a relay UE using one or more radio resource control (RRC) messages that are encapsulated in a dedicated sidelink signaling message directed to the relay UE, wherein the one or more RRC messages include an access stratum configuration for one or more sidelink interface radio bearers between the relay UE and the remote UE; and means for receiving a communication from the remote UE via the relay UE based at least in part on the access stratum configuration.

In some aspects, a method of wireless communication, performed by a remote UE, may include transmitting, via a sidelink interface, a broadcast message directed to a relay UE, wherein the broadcast message includes information associated with establishing a radio resource control (RRC) connection between the remote UE and a base station for communication via the relay UE; receiving, from the base station via the relay UE based at least in part on the information associated with establishing the RRC connection, an access stratum configuration for the sidelink interface between the remote UE and the relay UE; configuring one or more sidelink interface radio bearers in accordance with the access stratum configuration; and communicating with the base station via the relay UE using the one or more sidelink interface radio bearers.

In some aspects, a method of wireless communication, performed by a remote UE, may include establishing a sidelink unicast link with a relay UE using one or more sidelink signaling messages, wherein security for the sidelink unicast link is configured as part of a sidelink unicast link setup procedure for the sidelink unicast link; communicating with a base station via the relay UE on the sidelink unicast link using one or more RRC messages that are encapsulated in a sidelink interface signaling protocol message directed to the relay UE; receiving, from the base station via the one or more RRC messages, an access stratum configuration for the sidelink unicast link between the remote UE and the relay UE; and configuring a sidelink unicast link between the remote UE and the relay UE based at least in part on the received access stratum configuration.

In some aspects, a method of wireless communication, performed by a remote UE, may include communicating with a base station via a relay UE using one or more RRC messages that are encapsulated in a dedicated sidelink signaling message directed to the relay UE without sidelink interface security protection; receiving, from the base station via the one or more RRC messages, an access stratum configuration for a sidelink unicast link between the remote UE and a relay UE; and configuring the sidelink interface based at least in part on the received access stratum configuration.

In some aspects, a method of wireless communication, performed by a remote UE, may include establishing a sidelink unicast link with a relay UE using one or more sidelink signaling messages, wherein security and an access stratum configuration for the sidelink unicast link are configured as part of a sidelink unicast link setup procedure of the relay UE; communicating with a base station via the relay UE on a sidelink unicast link using one or more RRC messages that are encapsulated in a sidelink signaling message; receiving, from the base station via the one or more RRC messages, the access stratum configuration for the sidelink unicast link between the remote UE and the relay UE; and modifying the sidelink unicast link between the remote UE and the relay UE based at least in part on the received access stratum configuration.

In some aspects, a method of wireless communication, performed by a relay UE, may include receiving, via a sidelink interface from a remote UE, a broadcast message directed to the relay UE, wherein the broadcast message includes information associated with establishing an RRC connection between the remote UE and a base station for communication with the remote UE via the relay UE; configuring a security context for the remote UE in accordance with the broadcast message; receiving, from the base station based at least in part on the information associated with establishing the RRC connection, an access stratum configuration for the sidelink interface between the remote UE and the relay UE; configuring one or more sidelink interface radio bearers in accordance with the access stratum configuration; and providing a communication, received from the remote UE using the one or more sidelink interface radio bearers, to the base station.

In some aspects, a method of wireless communication, performed by a relay UE, may include establishing a sidelink unicast link with a remote UE using one or more sidelink signaling messages, wherein security for the sidelink unicast link is configured as part of a sidelink unicast link setup procedure for the sidelink unicast link; relaying a communication, from the remote UE to a base station, wherein the communication is received on the sidelink unicast link using one or more RRC messages that are encapsulated in a sidelink interface signaling protocol message directed to the relay UE; receiving, from the base station via the one or more RRC messages, an access stratum configuration for the sidelink unicast link between the remote UE and the relay UE; and configuring a sidelink unicast link between the remote UE and the relay UE based at least in part on the received access stratum configuration.

In some aspects, a method of wireless communication, performed by a relay UE, may include relaying a communication from a remote UE to a base station, wherein the communication includes one or more RRC messages that are encapsulated in a dedicated sidelink signaling message directed to the relay UE without sidelink interface security protection; receiving, from a base station via the one or more RRC messages, an access stratum configuration for a sidelink unicast link between the remote UE and a relay UE; and configuring the sidelink interface based at least in part on the received access stratum configuration.

In some aspects, a method of wireless communication, performed by a relay UE, may include establishing a sidelink unicast link with a remote UE using one or more sidelink signaling messages; relaying a communication, received from the remote UE on a unicast sidelink interface, using one or more RRC messages that are encapsulated in a sidelink signaling message; receiving, from a base station via an RRC message, an access stratum configuration for a unicast sidelink interface between the remote UE and the relay UE; and modifying the sidelink unicast link between the UE and the relay UE based at least in part on the received access stratum configuration.

In some aspects, a method of wireless communication, performed by a base station, may include transmitting, via a relay UE, a configuration for one or more sidelink interface radio bearers between the relay UE and a remote UE; and receiving a communication from the remote UE via the relay UE based at least in part on the configuration.

In some aspects, a remote UE for wireless communication may include memory and one or more processors operatively coupled to the memory. The memory and the one or more processors may be configured to transmit, via a sidelink interface, a broadcast message directed to a relay UE, wherein the broadcast message includes information associated with establishing an RRC connection between the remote UE and a base station for communication via the relay UE; receive, from the base station via the relay UE based at least in part on the information associated with establishing the RRC connection, an access stratum configuration for the sidelink interface between the remote UE and the relay UE; configure one or more sidelink interface radio bearers in accordance with the access stratum configuration; and communicate with the base station via the relay UE using the one or more sidelink interface radio bearers.

In some aspects, a remote UE for wireless communication may include memory and one or more processors operatively coupled to the memory. The memory and the one or more processors may be configured to establish a sidelink unicast link with a relay UE using one or more sidelink signaling messages, wherein security for the sidelink unicast link is configured as part of a sidelink unicast link setup procedure for the sidelink unicast link; communicate with a base station via the relay UE on the sidelink unicast link using one or more RRC messages that are encapsulated in a sidelink interface signaling protocol message directed to the relay UE; receive, from the base station via the one or more RRC messages, an access stratum configuration for the sidelink unicast link between the remote UE and the relay UE; and configure a sidelink unicast link between the remote UE and the relay UE based at least in part on the received access stratum configuration.

In some aspects, a remote UE for wireless communication may include memory and one or more processors operatively coupled to the memory. The memory and the one or more processors may be configured to communicate with a base station via a relay UE using one or more RRC messages that are encapsulated in a dedicated sidelink signaling message directed to the relay UE without sidelink interface security protection; receive, from the base station via the one or more RRC messages, an access stratum configuration for a sidelink unicast link between the remote UE and a relay UE; and configure the sidelink interface based at least in part on the received access stratum configuration.

In some aspects, a remote UE for wireless communication may include memory and one or more processors operatively coupled to the memory. The memory and the one or more processors may be configured to establish a sidelink unicast link with a relay UE using one or more sidelink signaling messages, wherein security and an access stratum configuration for the sidelink unicast link are configured as part of a sidelink unicast link setup procedure of the relay UE; communicate with a base station via the relay UE on a sidelink unicast link using one or more RRC messages that are encapsulated in a sidelink signaling message; receive, from the base station via the one or more RRC messages, the access stratum configuration for the sidelink unicast link between the remote UE and the relay UE; and modify the sidelink unicast link between the remote UE and the relay UE based at least in part on the received access stratum configuration.

In some aspects, a relay UE for wireless communication may include memory and one or more processors operatively coupled to the memory. The memory and the one or more processors may be configured to receive, via a sidelink interface from a remote UE, a broadcast message directed to the relay UE, wherein the broadcast message includes information associated with establishing an RRC connection between the remote UE and a base station for communication with the remote UE via the relay UE; configure a security context for the remote UE in accordance with the broadcast message; receive, from the base station based at least in part on the information associated with establishing the RRC connection, an access stratum configuration for the sidelink interface between the remote UE and the relay UE; configure one or more sidelink interface radio bearers in accordance with the access stratum configuration; and provide a communication, received from the remote UE using the one or more sidelink interface radio bearers, to the base station.

In some aspects, a relay UE for wireless communication may include memory and one or more processors operatively coupled to the memory. The memory and the one or more processors may be configured to establish a sidelink unicast link with a remote UE using one or more sidelink signaling messages, wherein security for the sidelink unicast link is configured as part of a sidelink unicast link setup procedure for the sidelink unicast link; relay a communication, from the remote UE to a base station, wherein the communication is received on the sidelink unicast link using one or more RRC messages that are encapsulated in a sidelink interface signaling protocol message directed to the relay UE; receive, from the base station via the one or more RRC messages, an access stratum configuration for the sidelink unicast link between the remote UE and the relay UE; and configure a sidelink unicast link between the remote UE and the relay UE based at least in part on the received access stratum configuration.

In some aspects, a relay UE for wireless communication may include memory and one or more processors operatively coupled to the memory. The memory and the one or more processors may be configured to relay a communication from a remote UE to a base station, wherein the communication includes one or more RRC messages that are encapsulated in a dedicated sidelink signaling message directed to the relay UE without sidelink interface security protection; receive, from a base station via the one or more RRC messages, an access stratum configuration for a sidelink unicast link between the remote UE and a relay UE; and configure the sidelink interface based at least in part on the received access stratum configuration.

In some aspects, a relay UE for wireless communication may include memory and one or more processors operatively coupled to the memory. The memory and the one or more processors may be configured to establish a sidelink unicast link with a remote UE using one or more sidelink signaling messages; relay a communication, received from the remote UE on a unicast sidelink interface, using one or more RRC messages that are encapsulated in a sidelink signaling message; receive, from a base station via an RRC message, an access stratum configuration for a unicast sidelink interface between the remote UE and the relay UE; and modify the sidelink unicast link between the UE and the relay UE based at least in part on the received access stratum configuration.

In some aspects, a base station for wireless communication may include memory and one or more processors operatively coupled to the memory. The memory and the one or more processors may be configured to transmit, via a relay UE, a configuration for one or more sidelink interface radio bearers between the relay UE and a remote UE; and receive a communication from the remote UE via the relay UE based at least in part on the configuration.

In some aspects, a non-transitory computer-readable medium may store one or more instructions for wireless communication. The one or more instructions, when executed by one or more processors of a remote UE, may cause the one or more processors to: transmit, via a sidelink interface, a broadcast message directed to a relay UE, wherein the broadcast message includes information associated with establishing an RRC connection between the remote UE and a base station for communication via the relay UE; receive, from the base station via the relay UE based at least in part on the information associated with establishing the RRC connection, an access stratum configuration for the sidelink interface between the remote UE and the relay UE; configure one or more sidelink interface radio bearers in accordance with the access stratum configuration; and communicate with the base station via the relay UE using the one or more sidelink interface radio bearers.

In some aspects, a non-transitory computer-readable medium may store one or more instructions for wireless communication. The one or more instructions, when executed by one or more processors of a remote UE, may cause the one or more processors to: establish a sidelink unicast link with a relay UE using one or more sidelink signaling messages, wherein security for the sidelink unicast link is configured as part of a sidelink unicast link setup procedure for the sidelink unicast link; communicate with a base station via the relay UE on the sidelink unicast link using one or more RRC messages that are encapsulated in a sidelink interface signaling protocol message directed to the relay UE; receive, from the base station via the one or more RRC messages, an access stratum configuration for the sidelink unicast link between the remote UE and the relay UE; and configure a sidelink unicast link between the remote UE and the relay UE based at least in part on the received access stratum configuration.

In some aspects, a non-transitory computer-readable medium may store one or more instructions for wireless communication. The one or more instructions, when executed by one or more processors of a remote UE, may cause the one or more processors to: communicate with a base station via a relay UE using one or more RRC messages that are encapsulated in a dedicated sidelink signaling message directed to the relay UE without sidelink interface security protection; receive, from the base station via the one or more RRC messages, an access stratum configuration for a sidelink unicast link between the remote UE and a relay UE; and configure the sidelink interface based at least in part on the received access stratum configuration.

In some aspects, a non-transitory computer-readable medium may store one or more instructions for wireless communication. The one or more instructions, when executed by one or more processors of a remote UE, may cause the one or more processors to: establish a sidelink unicast link with a relay UE using one or more sidelink signaling messages, wherein security and an access stratum configuration for the sidelink unicast link are configured as part of a sidelink unicast link setup procedure of the relay UE; communicate with a base station via the relay UE on a sidelink unicast link using one or more RRC messages that are encapsulated in a sidelink signaling message; receive, from the base station via the one or more RRC messages, the access stratum configuration for the sidelink unicast link between the remote UE and the relay UE; and modify the sidelink unicast link between the remote UE and the relay UE based at least in part on the received access stratum configuration.

In some aspects, a non-transitory computer-readable medium may store one or more instructions for wireless communication. The one or more instructions, when executed by one or more processors of a relay UE, may cause the one or more processors to: receive, via a sidelink interface from a remote UE, a broadcast message directed to the relay UE, wherein the broadcast message includes information associated with establishing an RRC connection between the remote UE and a base station for communication with the remote UE via the relay UE; configure a security context for the remote UE in accordance with the broadcast message; receive, from the base station based at least in part on the information associated with establishing the RRC connection, an access stratum configuration for the sidelink interface between the remote UE and the relay UE; configure one or more sidelink interface radio bearers in accordance with the access stratum configuration; and provide a communication, received from the remote UE using the one or more sidelink interface radio bearers, to the base station.

In some aspects, a non-transitory computer-readable medium may store one or more instructions for wireless communication. The one or more instructions, when executed by one or more processors of a relay UE, may cause the one or more processors to: establish a sidelink unicast link with a remote UE using one or more sidelink signaling messages, wherein security for the sidelink unicast link is configured as part of a sidelink unicast link setup procedure for the sidelink unicast link; relay a communication, from the remote UE to a base station, wherein the communication is received on the sidelink unicast link using one or more RRC messages that are encapsulated in a sidelink interface signaling protocol message directed to the relay UE; receive, from the base station via the one or more RRC messages, an access stratum configuration for the sidelink unicast link between the remote UE and the relay UE; and configure a sidelink unicast link between the remote UE and the relay UE based at least in part on the received access stratum configuration.

In some aspects, a non-transitory computer-readable medium may store one or more instructions for wireless communication. The one or more instructions, when executed by one or more processors of a relay UE, may cause the one or more processors to: relay a communication from a remote UE to a base station, wherein the communication includes one or more RRC messages that are encapsulated in a dedicated sidelink signaling message directed to the relay UE without sidelink interface security protection; receive, from a base station via the one or more RRC messages, an access stratum configuration for a sidelink unicast link between the remote UE and a relay UE; and configure the sidelink interface based at least in part on the received access stratum configuration.

In some aspects, a non-transitory computer-readable medium may store one or more instructions for wireless communication. The one or more instructions, when executed by one or more processors of a relay UE, may cause the one or more processors to: establish a sidelink unicast link with a remote UE using one or more sidelink signaling messages; relay a communication, received from the remote UE on a unicast sidelink interface, using one or more RRC messages that are encapsulated in a sidelink signaling message; receive, from a base station via an RRC message, an access stratum configuration for a unicast sidelink interface between the remote UE and the relay UE; and modify the sidelink unicast link between the UE and the relay UE based at least in part on the received access stratum configuration.

In some aspects, a non-transitory computer-readable medium may store one or more instructions for wireless communication. The one or more instructions, when executed by one or more processors of a base station, may cause the one or more processors to: transmit, via a relay UE, a configuration for one or more sidelink interface radio bearers between the relay UE and a remote UE; and receive a communication from the remote UE via the relay UE based at least in part on the configuration.

In some aspects, an apparatus for wireless communication may include means for transmitting, via a sidelink interface, a broadcast message directed to a relay UE, wherein the broadcast message includes information associated with establishing an RRC connection between the apparatus and a base station for communication via the relay UE; means for receiving, from the base station via the relay UE based at least in part on the information associated with establishing the RRC connection, an access stratum configuration for the sidelink interface between the apparatus and the relay UE; means for configuring one or more sidelink interface radio bearers in accordance with the access stratum configuration; and means for communicating with the base station via the relay UE using the one or more sidelink interface radio bearers.

In some aspects, an apparatus for wireless communication may include means for establishing a sidelink unicast link with a relay UE using one or more sidelink signaling messages, wherein security for the sidelink unicast link is configured as part of a sidelink unicast link setup procedure for the sidelink unicast link; means for communicating with a base station via the relay UE on the sidelink unicast link using one or more RRC messages that are encapsulated in a sidelink interface signaling protocol message directed to the relay UE; means for receiving, from the base station via the one or more RRC messages, an access stratum configuration for the sidelink unicast link between the apparatus and the relay UE; and means for configuring a sidelink unicast link between the apparatus and the relay UE based at least in part on the received access stratum configuration.

In some aspects, an apparatus for wireless communication may include means for communicating with a base station via a relay UE using one or more RRC messages that are encapsulated in a dedicated sidelink signaling message directed to the relay UE with no security protection on a sidelink interface between the relay UE and the apparatus; means for receiving, from the base station via the one or more RRC messages, an access stratum configuration for a sidelink unicast link between the apparatus and a relay UE; and means for configuring the sidelink interface based at least in part on the received access stratum configuration.

In some aspects, an apparatus for wireless communication may include means for establishing a sidelink unicast link with a relay UE using one or more sidelink signaling messages, wherein security and an access stratum configuration for the sidelink unicast link are configured as part of a sidelink unicast link setup procedure of the relay UE; means for communicating with a base station via the relay UE on a sidelink unicast link using one or more RRC messages that are encapsulated in a sidelink signaling message; means for receiving, from the base station via the one or more RRC messages, the access stratum configuration for the sidelink unicast link between the apparatus and the relay UE; and means for modifying the sidelink unicast link between the apparatus and the relay UE based at least in part on the received access stratum configuration.

In some aspects, an apparatus for wireless communication may include means for receiving, via a sidelink interface from a remote UE, a broadcast message directed to the apparatus, wherein the broadcast message includes information associated with establishing an RRC connection between the remote UE and a base station for communication with the remote UE via the apparatus; means for configuring a security context for the remote UE in accordance with the broadcast message; means for receiving, from the base station based at least in part on the information associated with establishing the RRC connection, an access stratum configuration for the sidelink interface between the remote UE and the apparatus; means for configuring one or more sidelink interface radio bearers in accordance with the access stratum configuration; and means for providing a communication, received from the remote UE using the one or more sidelink interface radio bearers, to the base station.

In some aspects, an apparatus for wireless communication may include means for establishing a sidelink unicast link with a remote UE using one or more sidelink signaling messages, wherein security for the sidelink unicast link is configured as part of a sidelink unicast link setup procedure for the sidelink unicast link; means for relaying a communication, from the remote UE to a base station, wherein the communication is received on the sidelink unicast link using one or more RRC messages that are encapsulated in a sidelink interface signaling protocol message directed to the apparatus; means for receiving, from the base station via the one or more RRC messages, an access stratum configuration for the sidelink unicast link between the remote UE and the apparatus; and means for configuring a sidelink unicast link between the remote UE and the apparatus based at least in part on the received access stratum configuration.

In some aspects, an apparatus for wireless communication may include means for relaying a communication from a remote UE to a base station, wherein the communication includes one or more RRC messages that are encapsulated in a dedicated sidelink signaling message directed to the apparatus with no security protection on a sidelink interface between the apparatus and the remote UE; means for receiving, from a base station via the one or more RRC messages, an access stratum configuration for a sidelink unicast link between the remote UE and the apparatus; and means for configuring the sidelink interface based at least in part on the received access stratum configuration.

In some aspects, an apparatus for wireless communication may include means for establishing a sidelink unicast link with a remote UE using one or more sidelink signaling messages; means for relaying a communication, received from the remote UE on a unicast sidelink interface, using one or more RRC messages that are encapsulated in a sidelink signaling message; means for receiving, from a base station via an RRC message, an access stratum configuration for a unicast sidelink interface between the remote UE and the apparatus; and means for modifying the sidelink unicast link between the UE and the apparatus based at least in part on the received access stratum configuration.

In some aspects, an apparatus for wireless communication may include means for transmitting, via a relay UE, a configuration for one or more sidelink interface radio bearers between the relay UE and a remote UE; and means for receiving a communication from the remote UE via the relay UE based at least in part on the configuration.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
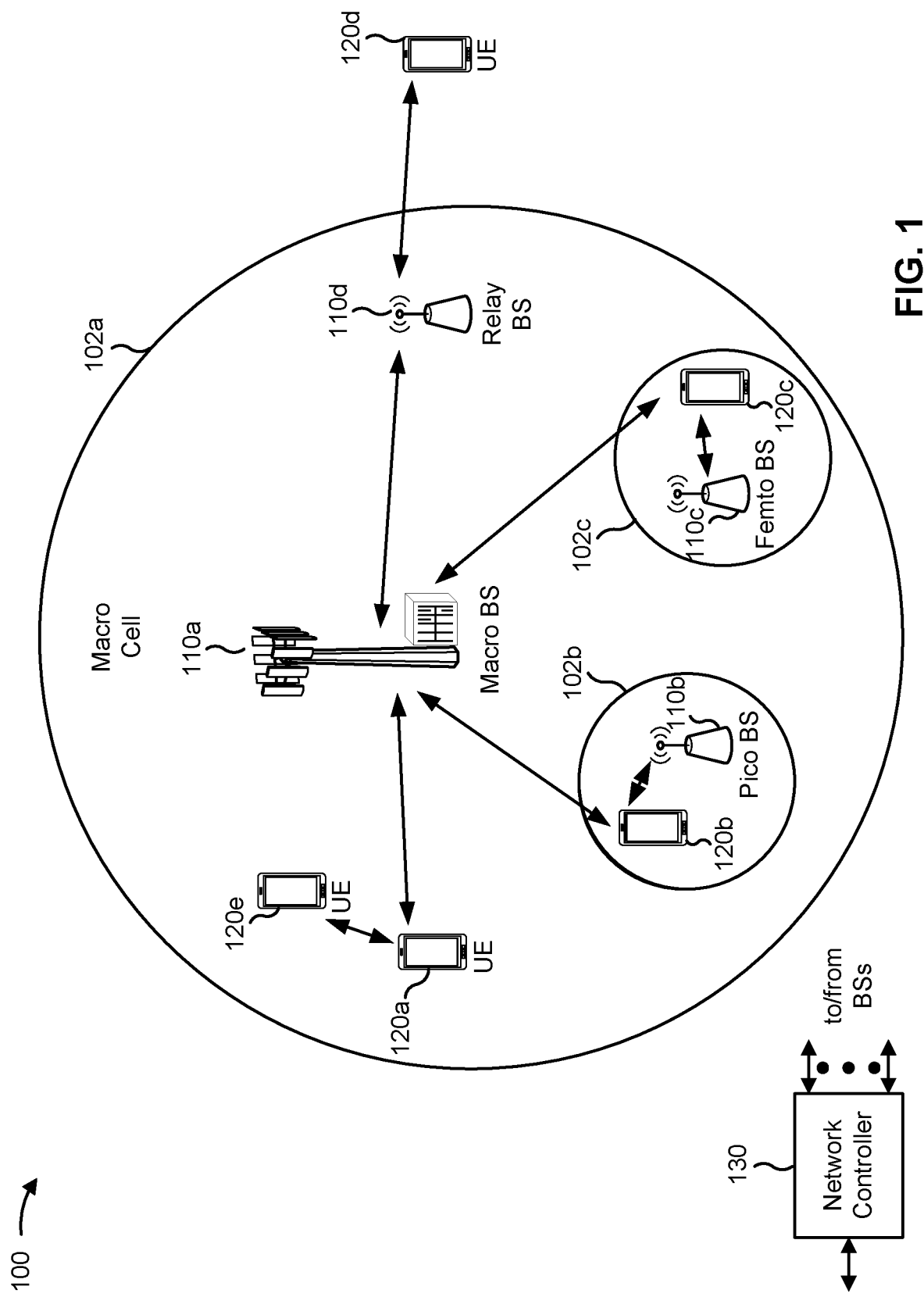
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts)

whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
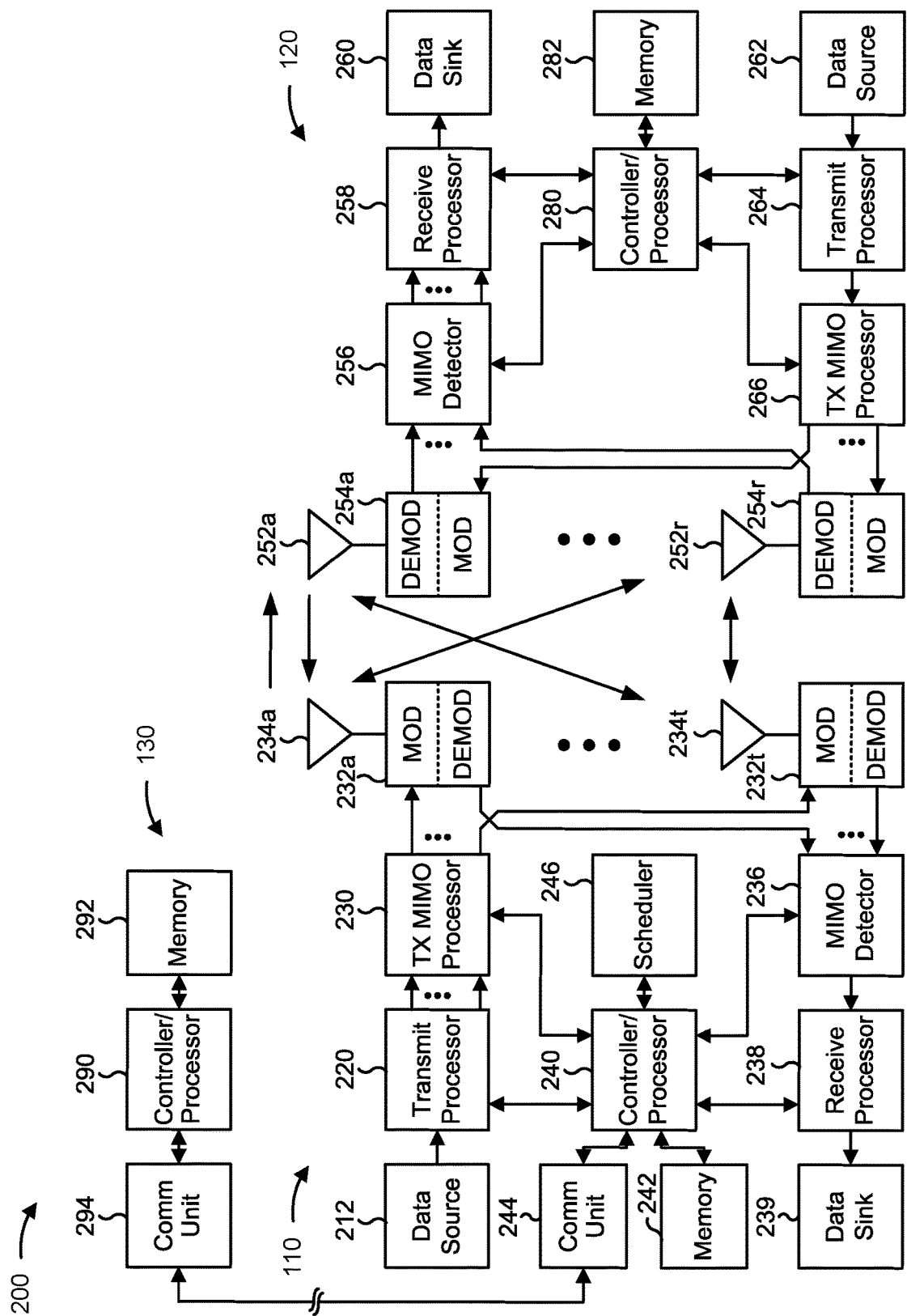
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink interface and user equipment control plane configurations for a user equipment to network relay, as described in more detail elsewhere herein. For example, controller/processor 240 of base station 110, controller/processor 280 of UE 120, and/or any other component(s) of FIG. 2 may perform or direct operations of, for example, processes 1100 through 1900 of FIGS. 11-19, respectively, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, processes 1100 through 1900 of FIGS. 11-19, respectively, and/or other processes as described herein. A scheduler 246 may schedule UEs for data transmission on the downlink and/or uplink.

In some aspects, UE 120 (e.g., a remote UE) may include means for transmitting, via a sidelink interface, a broadcast message directed to a relay UE, wherein the broadcast message includes information associated with establishing an RRC connection between the remote UE and a base station for communication via the relay UE; means for receiving, from the base station via the relay UE based at least in part on the information associated with establishing the RRC connection, an access stratum configuration for the sidelink interface between the remote UE and the relay UE; means for configuring one or more sidelink interface radio bearers in accordance with the access stratum configuration; means for communicating with the base station via the relay UE using the one or more sidelink interface radio bearers; means for establishing a sidelink unicast link with a relay UE using one or more sidelink signaling interface messages, wherein security for the sidelink unicast link is configured as part of a sidelink unicast link setup procedure for the sidelink unicast link; means for communicating with a base station via the relay UE on the sidelink unicast link using one or more RRC messages that are encapsulated in a sidelink interface signaling protocol message directed to the relay UE; means for receiving, from the base station via the one or more RRC messages, an access stratum configuration for the sidelink unicast link between the remote UE and the relay UE; means for configuring a sidelink unicast link between the remote UE and the relay UE based at least in part on the received access stratum configuration; means for communicating with a base station via a relay UE using one or more RRC messages that are encapsulated in a dedicated sidelink signaling interface message directed to the relay UE without sidelink interface security protection; means for receiving, from the base station via the one or more RRC messages, an access stratum configuration for a sidelink unicast link between the remote UE and a relay UE; means for configuring the sidelink interface based at least in part on the received access stratum configuration; means for establishing a sidelink unicast link with a relay UE using one or more sidelink signaling messages, wherein security and an access stratum configuration for the sidelink unicast link are configured as part of a sidelink unicast link setup procedure of the relay UE; means for communicating with a base station via the relay UE on a sidelink unicast link using one or more RRC messages that are encapsulated in a sidelink signaling message; means for receiving, from the base station via the one or more RRC messages, the access stratum configuration for the sidelink unicast link between the remote UE and the relay UE; means for modifying the sidelink unicast link between the remote UE and the relay UE based at least in part on the received access stratum configuration; means for communicating with a network entity via a relay UE using one or more radio resource control (RRC) messages that are encapsulated in a dedicated sidelink signaling message directed to the relay UE; means for receiving, from the network entity via the one or more RRC messages, an access stratum configuration for a sidelink unicast link between the remote UE and the relay UE; means for configuring the sidelink unicast link based at least in part on the received access stratum configuration; means for establishing a sidelink unicast link with a remote UE using one or more sidelink signaling messages; means for relaying a communication, received from the remote UE on a unicast sidelink interface, using one or more RRC messages that are encapsulated in a sidelink signaling message; means for receiving, from a network entity via an RRC message, an access stratum configuration for a unicast sidelink interface between the remote UE and the relay UE; means for modifying the sidelink unicast link between the UE and the relay UE based at least in part on the received access stratum configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 (e.g., a relay UE for a remote UE) may include means for receiving, via a sidelink interface from a remote UE, a broadcast message directed to the relay UE, wherein the broadcast message includes information associated with establishing an RRC connection between the remote UE and a base station for communication with the remote UE via the relay UE; means for configuring a security context for the remote UE in accordance with the broadcast message; means for receiving, from the base station based at least in part on the information associated with establishing the RRC connection, an access stratum configuration for the sidelink interface between the remote UE and the relay UE; means for configuring one or more sidelink interface radio bearers in accordance with the access stratum configuration; means for providing a communication, received from the remote UE using the one or more sidelink interface radio bearers, to the base station; means for establishing a sidelink unicast link with a remote UE using one or more sidelink signaling messages, wherein security for the sidelink unicast link is configured as part of a sidelink unicast link setup procedure for the sidelink unicast link; means for relaying a communication, from the remote UE to a base station, wherein the communication is received on the sidelink unicast link using one or more RRC messages that are encapsulated in a sidelink interface signaling protocol message directed to the relay UE; means for receiving, from the base station via the one or more RRC messages, an access stratum configuration for the sidelink unicast link between the remote UE and the relay UE; means for configuring a sidelink unicast link between the remote UE and the relay UE based at least in part on the received access stratum configuration; means for providing, by the adaptation layer, the communication on a Uu interface of the relay UE; means for relaying a communication from a remote UE to a base station, wherein the communication includes one or more RRC messages that are encapsulated in a dedicated sidelink signaling message directed to the relay UE without sidelink interface security protection; means for receiving, from a base station via the one or more RRC messages, an access stratum configuration for a sidelink unicast link between the remote UE and a relay UE; means for configuring the sidelink interface based at least in part on the received access stratum configuration; means for providing, by the adaptation layer, the communication on a Uu interface of the relay UE; means for determining that the remote UE is not associated with a context at the relay UE; means for establishing the context at the relay UE for the remote UE; means for establishing a sidelink unicast link with a remote UE using one or more sidelink signaling messages; means for relaying a communication, received from the remote UE on a unicast sidelink interface, using one or more RRC messages that are encapsulated in a sidelink signaling message; means for receiving, from a base station via an RRC message, an access stratum configuration for a unicast sidelink interface between the remote UE and the relay UE; means for modifying the sidelink unicast link between the UE and the relay UE based at least in part on the received access stratum configuration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, via a relay UE, a configuration for one or more sidelink interface radio bearers between the relay UE and a remote UE, means for receiving a communication from the remote UE via the relay UE based at least in part on the configuration, means for communicating with a remote user equipment (UE) via a relay UE using one or more radio resource control (RRC) messages that are encapsulated in a dedicated sidelink signaling message directed to the relay UE, wherein the one or more RRC messages include an access stratum configuration for one or more sidelink interface radio bearers between the relay UE and the remote UE, means for receiving a communication from the remote UE via the relay UE based at least in part on the access stratum configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE (referred to herein as a relay UE) may relay communications from another UE (referred to herein as a remote UE) to a network or from the network to the remote UE. In some aspects, the relay UE may perform Layer 2 UE-to-network relaying, in which an adaptation layer of the relay UE performs forwarding of the remote UE's communications via the radio link control (RLC) layer, as compared to Layer 3 relaying which may occur in the Internet Protocol (IP) layer. More generally, "Layer 2 relaying" can refer to a relay service performed in a layer higher than the physical layer and lower than an Internet-based layer or an application-based layer. The techniques and apparatuses described herein are not limited to those involving Layer 2 UE-to-network relaying. Communications between the relay UE and the remote UE may be referred to herein as sidelink communications. In some UE-to-network relaying applications, non-access-stratum (NAS) and RRC messages may be transparently transferred between the remote UE and the network using packet data convergence protocol (PDCP) end-to-end connections.

The ProSe Sidelink (PC5) interface may provide a sidelink interface between UEs. For example, Vehicle-to-Anything (V2X) communications in accordance with NR Release 16 may be performed using a PC5 unicast control plane stack, which may include a PC5 signaling (PC5-S) interface and a PC5 access-stratum (AS) (PC5-AS) interface, such as a PC5-RRC interface. UEs communicating using the PC5 interface may configure a unicast link context and exchange AS information using the PC5-S interface and the PC5-RRC interface.

A UE that is to perform UE-to-network relaying using a PC5 interface may, or may not, be configured with a PC5-S interface and/or a PC5-RRC interface. Therefore, there may be ambiguity in how configuration of a sidelink interface between a relay UE and a remote UE, configuration of radio bearers, and security setup should be performed for such a UE. This ambiguity may lead to suboptimal or non-functional UE-to-network forwarding, thereby reducing coverage and throughput for the remote UE.

Some techniques and apparatuses described herein provide signaling schemes and configurations for UE-to-network relaying between a remote UE and a relay UE that use PC5 interfaces. For example, some techniques and apparatuses described herein provide signaling schemes and configurations for UEs that use neither a PC5-S nor a PC5-RRC interface, only a PC5-S interface, or both of a PC5-S interface and a PC5-RRC interface. Furthermore, some techniques and apparatuses described herein provide security setup and radio bearer configuration for such UEs. Thus, UE-to-network relaying, such as Layer 2 UE-to-network relaying, may be enabled for UEs using PC5 interfaces, which improves network throughput and coverage, particularly for V2X devices.

Figure 3:
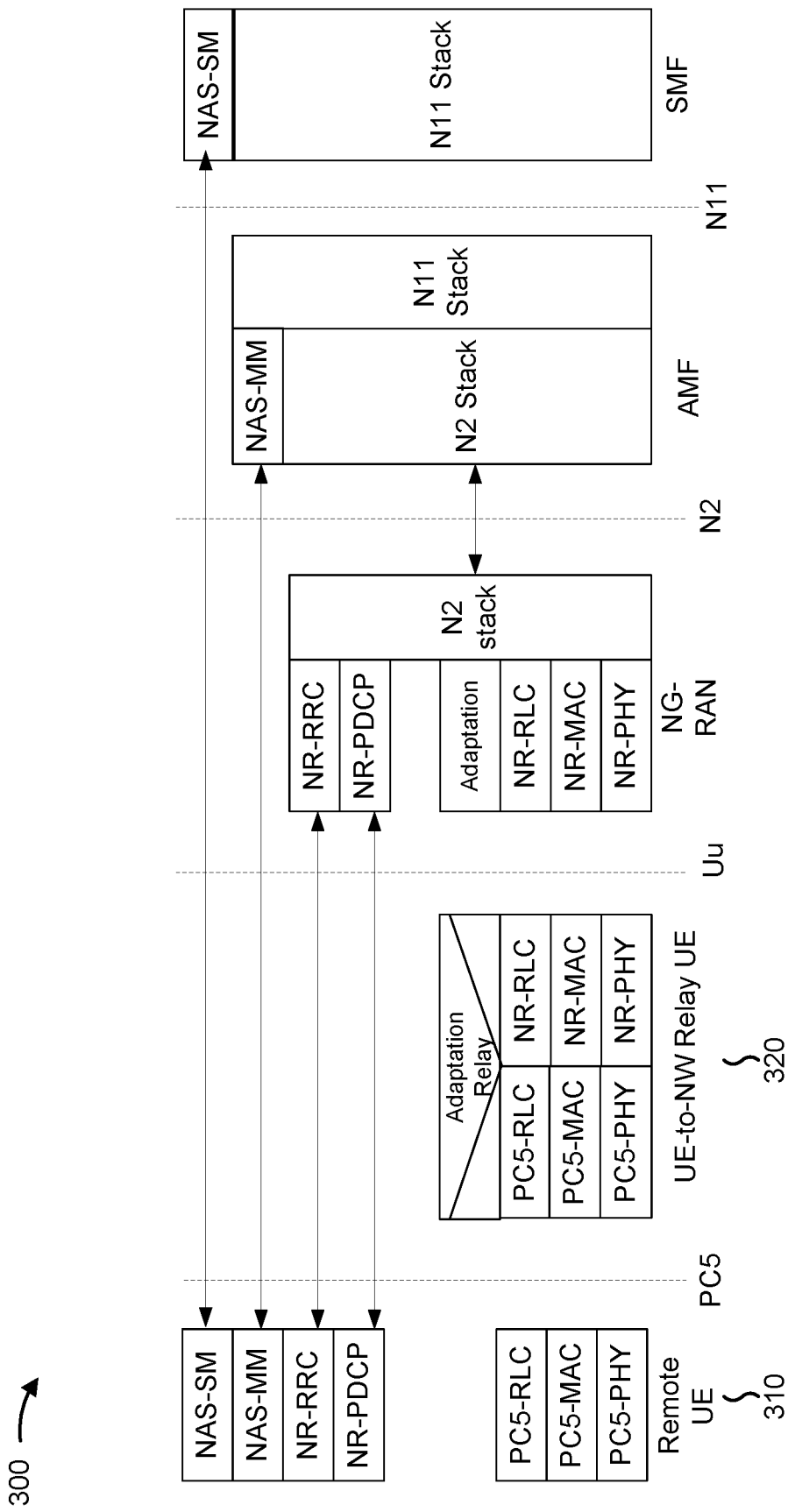
FIG. 3 is a diagram illustrating an example of a control-plane protocol architecture for a UE-to-network relay that is not configured with a sidelink signaling entity or a sidelink access stratum entity, in accordance with various aspects of the present disclosure.
Figure 4:
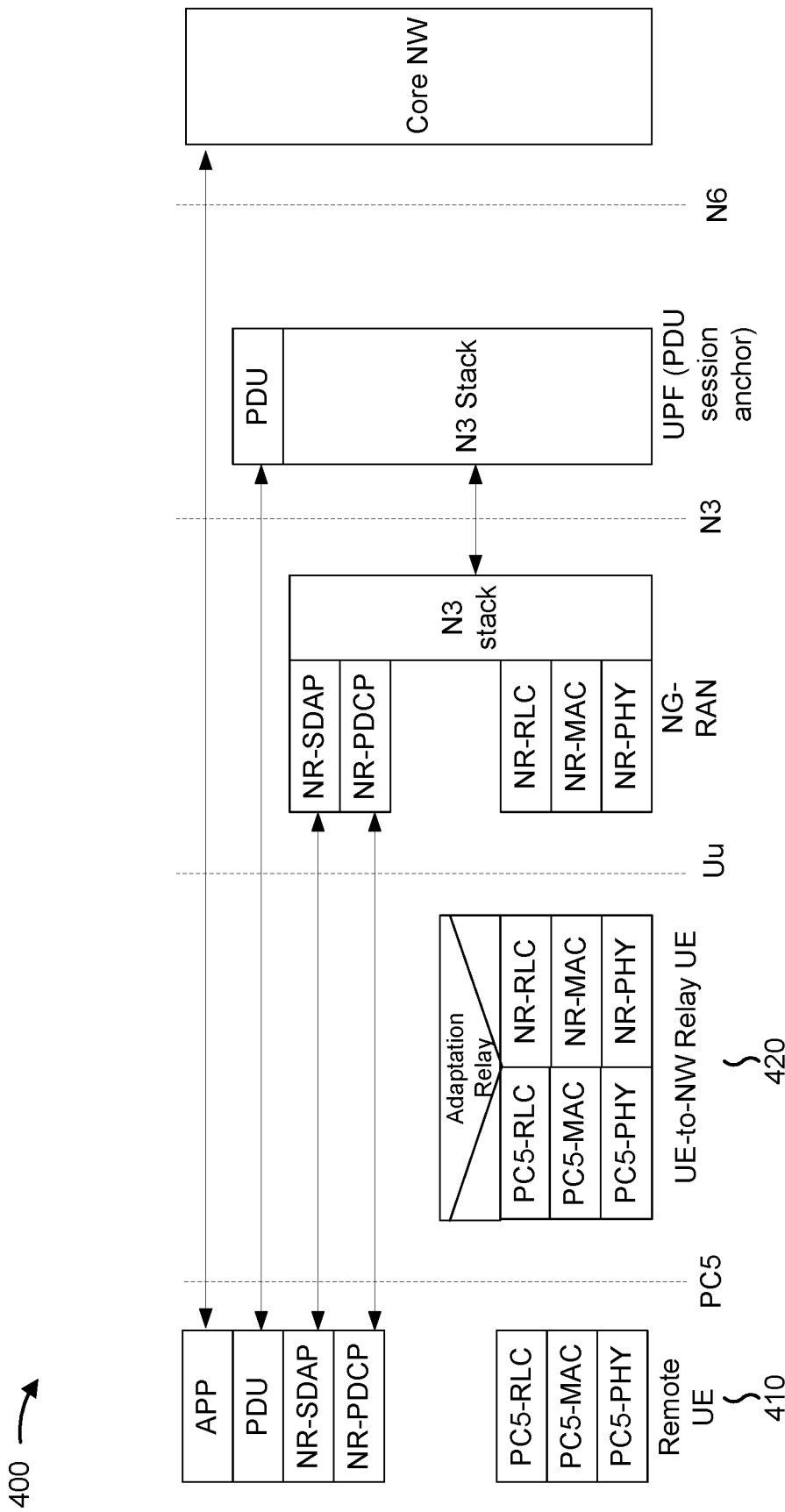
FIG. 4 is a diagram illustrating an example of a user-plane protocol architecture for a UE-to-network relay that is not configured with a sidelink signaling entity or a sidelink access stratum entity, in accordance with various aspects of the present disclosure.

FIG. 3 is a diagram illustrating an example of a control-plane protocol architecture 300 for a UE-to-network relay that is not configured with a sidelink signaling entity or a sidelink access stratum entity, in accordance with various aspects of the present disclosure. FIG. 4 is a diagram illustrating an example of a user-plane protocol architecture 400 for a UE-to-network relay that is not configured with a sidelink signaling entity or a sidelink access stratum entity, in accordance with various aspects of the present disclosure. For example, the control-plane protocol architecture 300 and the user-plane protocol architecture 400 may correspond to a remote UE (e.g., UE 120) shown by reference numbers 310 and 410 and a relay UE (e.g., UE 120) shown by reference numbers 320 and 420.

As shown in FIG. 3, there may be a PC5 interface between the remote UE and the relay UE, a Uu interface between the relay UE and a next generation radio access network (NG-RAN, also referred to herein as a 5G access network (5G-AN), an N2 interface between the NG-RAN and an access and mobility management function (AMF) of the control-plane protocol architecture 300, and an N11 interface between the AMF and a session management function (SMF).

As shown in FIG. 4, there may be an N3 interface between the NG-RAN and a user plane function (UPF) of the user-plane protocol architecture 400, and an N6 interface between the UPF and a core network.

Figure 5:
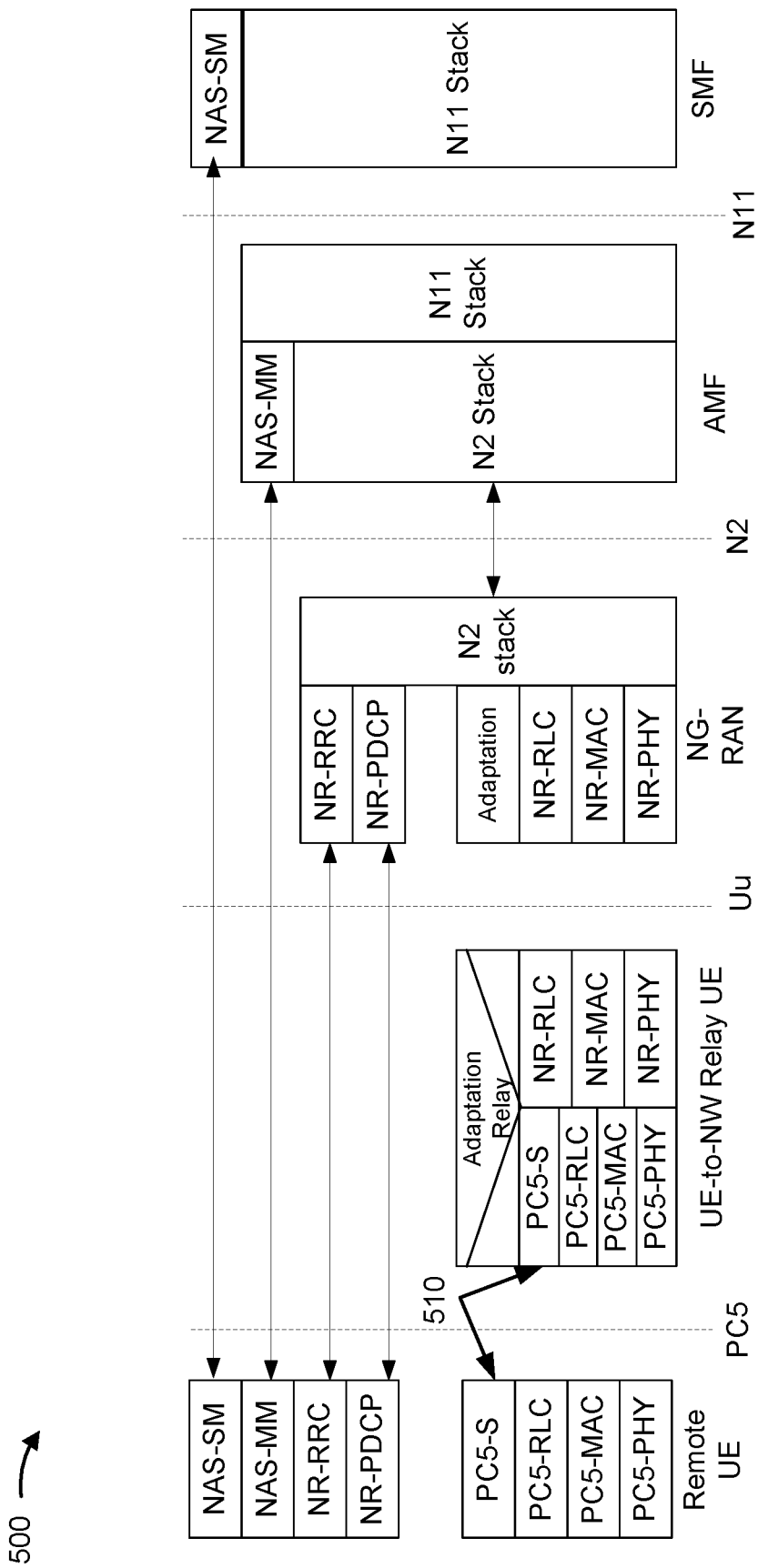
FIG. 5 is a diagram illustrating an example of a control-plane protocol architecture for a UE that is configured with a sidelink signaling entity, in accordance with various aspects of the present disclosure.
Figure 6:
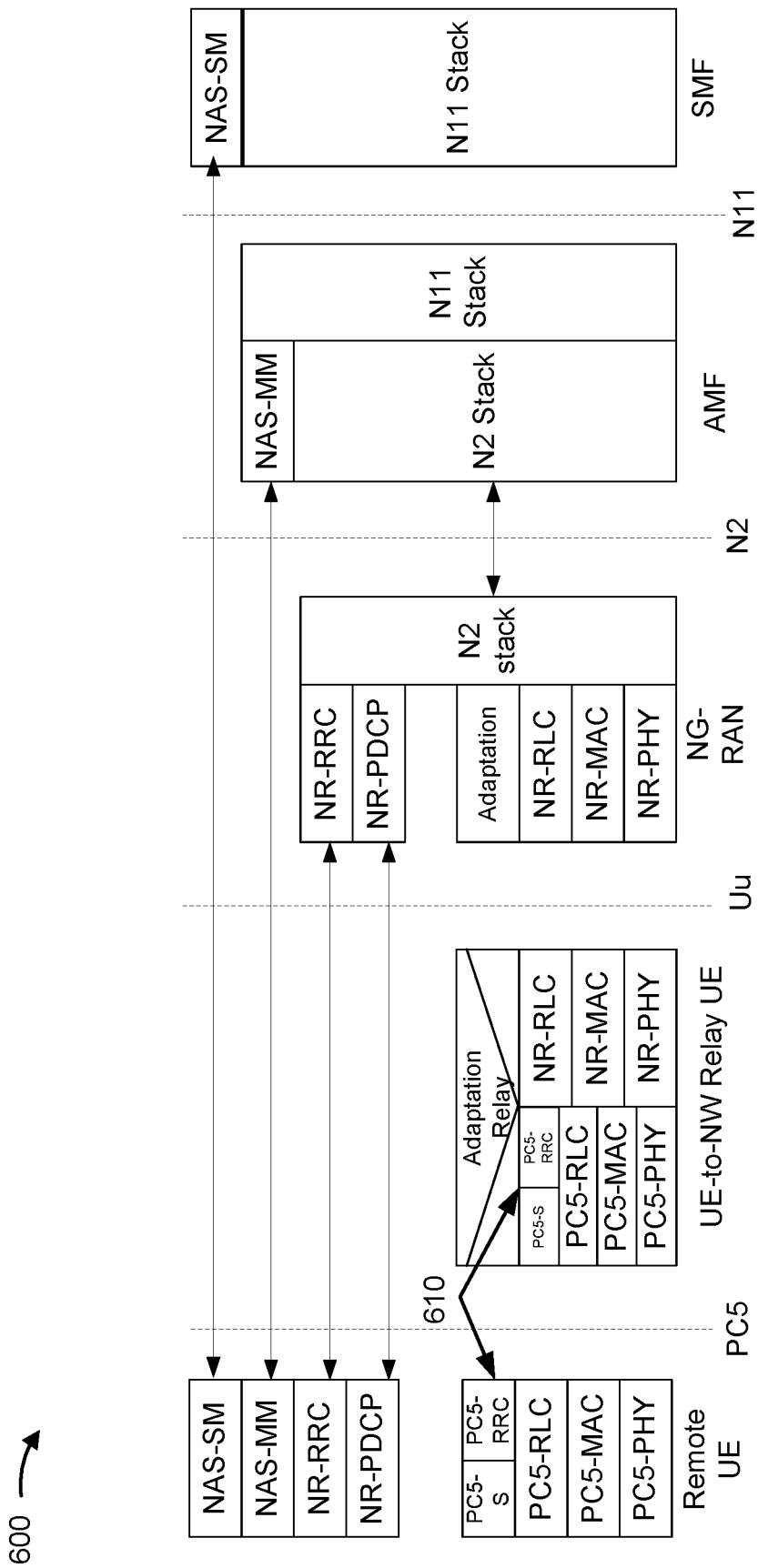
FIG. 6 is a diagram illustrating an example of a control-plane protocol architecture for a UE that is configured with a sidelink signaling entity and a sidelink access stratum entity, in accordance with various aspects of the present disclosure.
Figure 8:
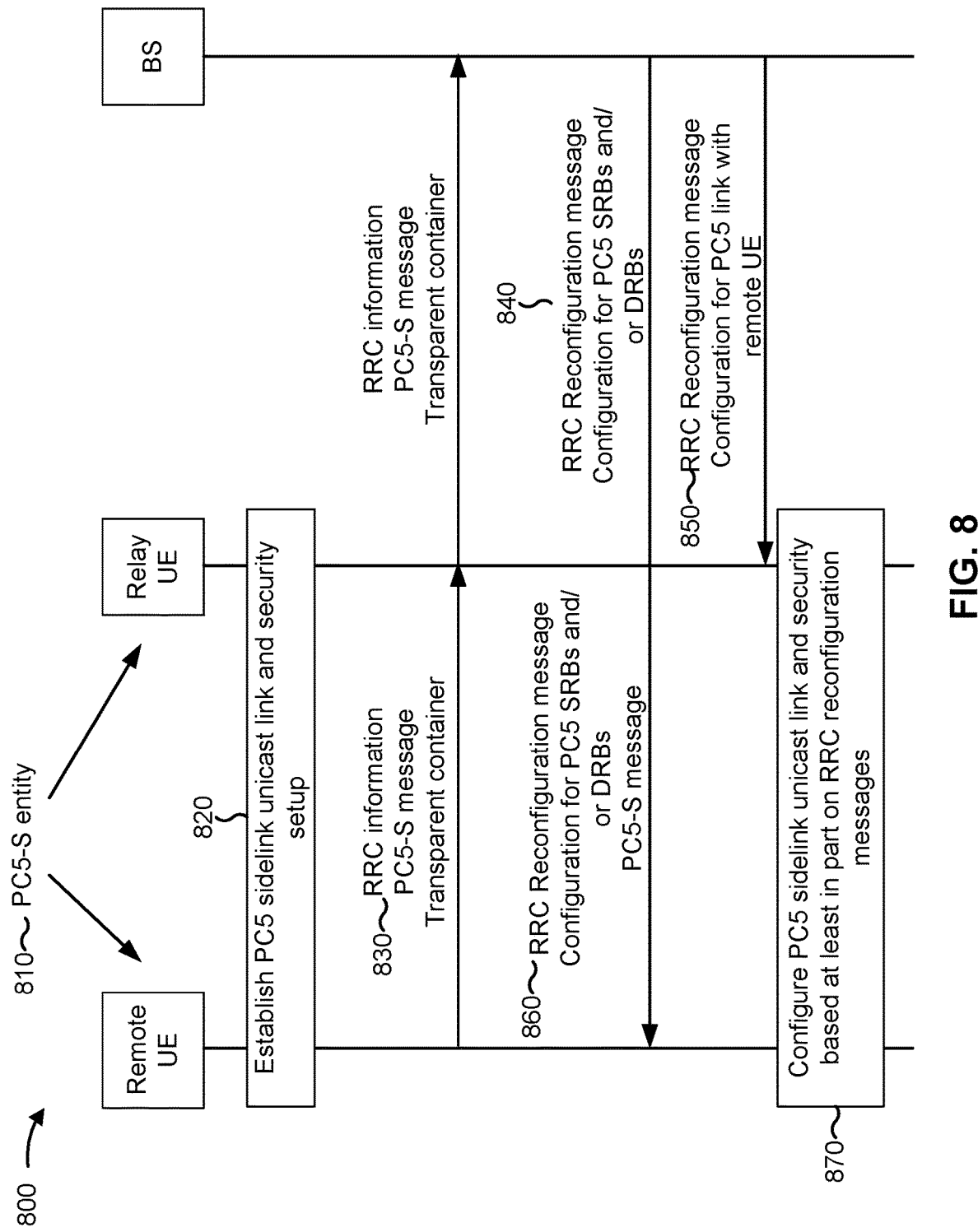
FIG. 8 is a diagram illustrating an example of signaling for UE-to-network relaying for a remote UE that is configured with a sidelink signaling entity, in accordance with various aspects of the present disclosure.
Figure 9:
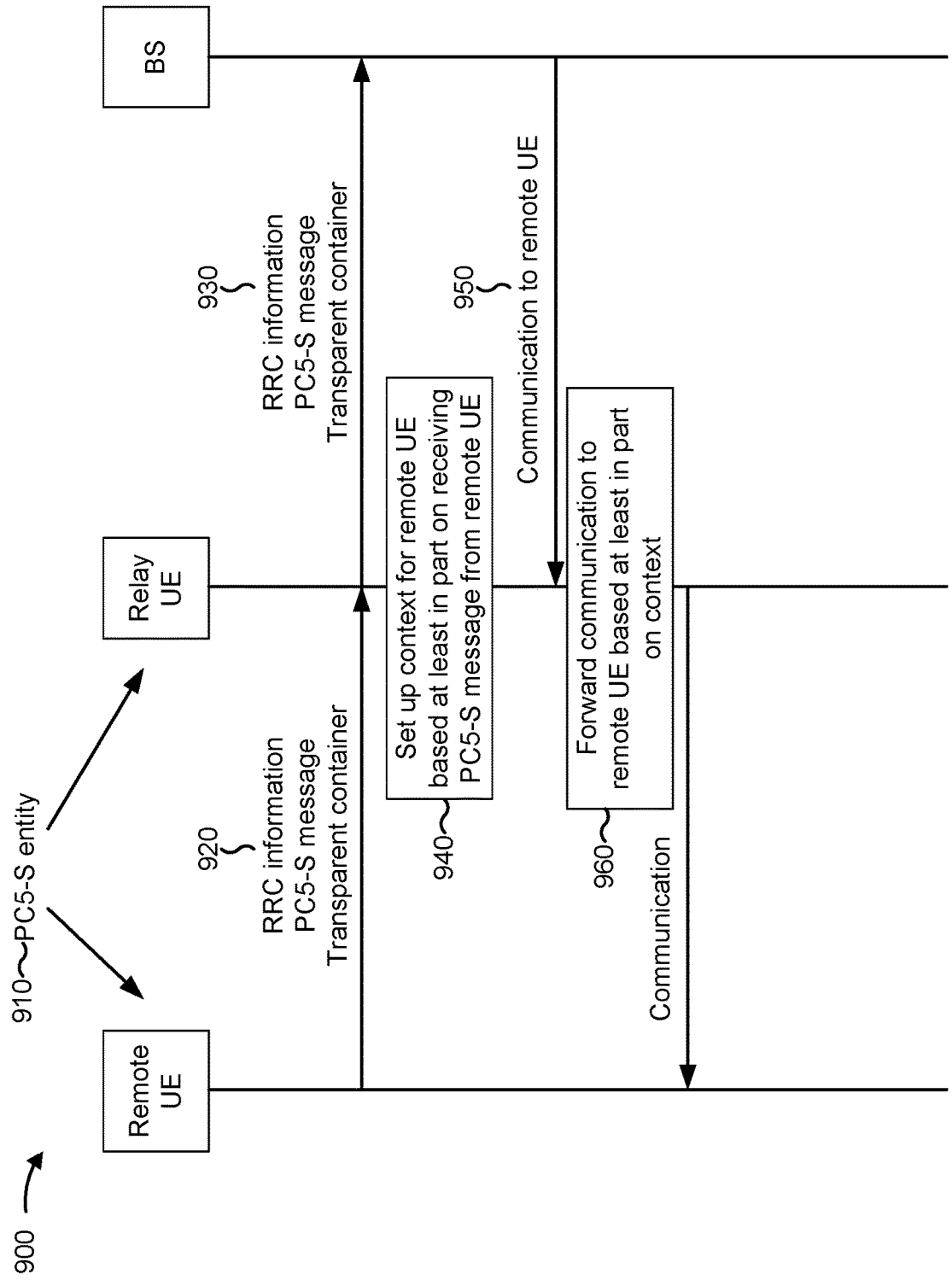
FIG. 9 is a diagram illustrating another example of signaling for UE-to-network relaying for a remote UE that is configured with a sidelink signaling entity, in accordance with various aspects of the present disclosure.
Figure 10:
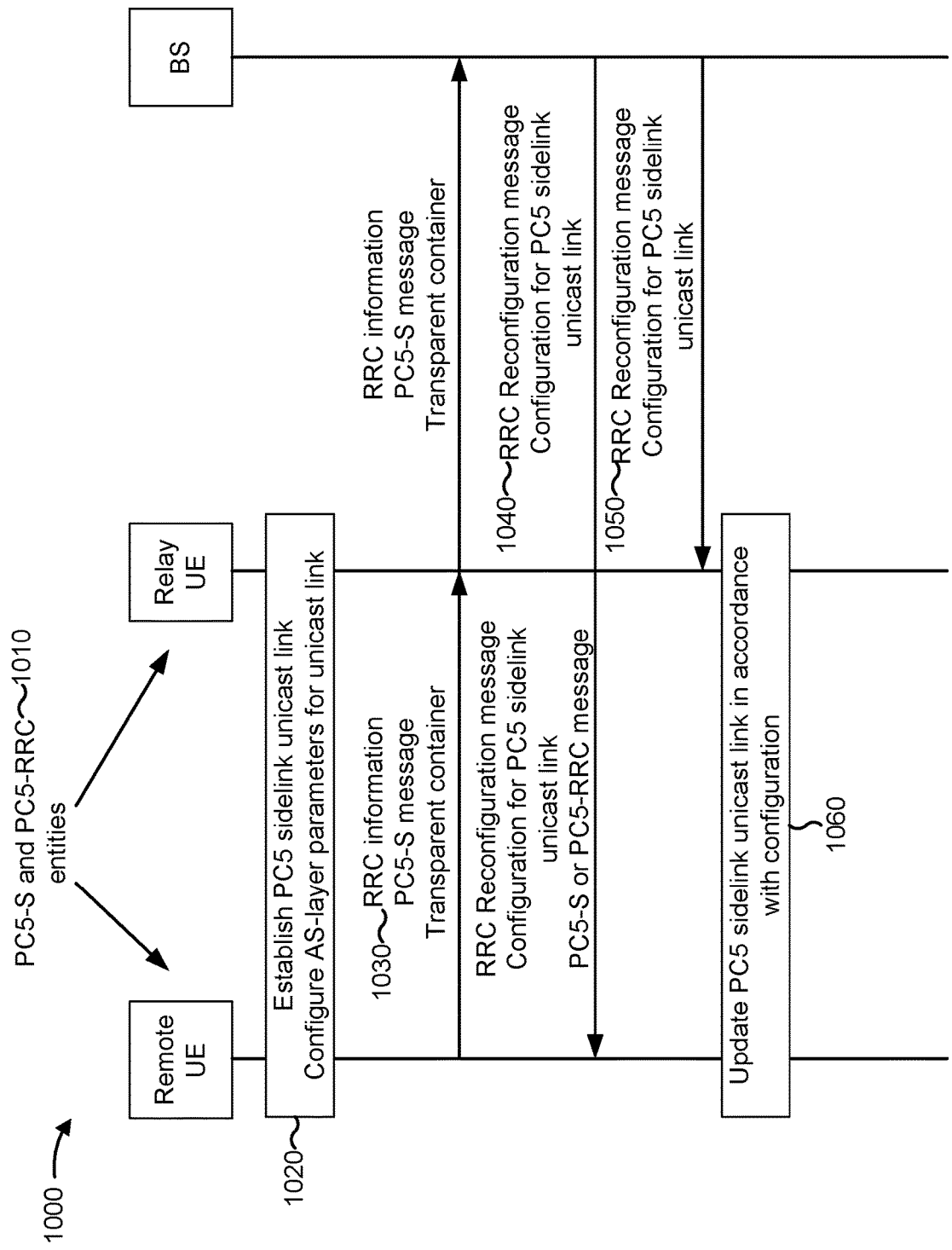
FIG. 10 is a diagram illustrating an example of signaling for UE-to-network relaying for a remote UE that is configured with a sidelink signaling entity and a sidelink access stratum entity, in accordance with various aspects of the present disclosure.

As further shown, the remote UE and the relay UE may be associated with respective PC5 protocol entities, enabling communication on the PC5 interface between the remote UE and the relay UE. In FIGS. 3 and 4, the remote UE and the relay UE are not associated with respective PC5-S or PC5-RRC entities. Examples of UE-to-network relay signaling configurations for UEs without PC5-S or PC5-RRC entities are described in connection with FIG. 7. An example of a protocol architecture for UEs associated with PC5-S entities is shown in FIG. 5, and corresponding UE-to-network relay signaling configurations are shown in FIGS. 8 and 9. An example of a protocol architecture for UEs associated with PC5-S entities and PC5-RRC entities is shown in FIG. 6, and a corresponding UE-to-network relay signaling configuration is shown in FIG. 10. The adaptation layer of the relay UE may handle relaying from the remote UE to the network or from the network to the remote UE. As used herein, "the network" may refer to any one or more of the NG-RAN, the AMF, the SMF, the UPF, or the core network.

As indicated above, FIGS. 3 and 4 are provided as examples. Other examples may differ from what is described with respect to FIGS. 3 and 4.

FIG. 5 is a diagram illustrating an example 500 of a control-plane protocol architecture for a UE that is configured with a sidelink signaling entity, in accordance with various aspects of the present disclosure. As shown in FIG. 5, and by reference number 510, the remote UE and the relay UE are configured with respective PC5-S entities. The PC5-S entities may handle signaling between the remote UE and the relay UE, such as direct communication requests, authentication, key establishment, security setup, and/or the like.

As indicated above, FIG. 5 is provided as an example. Other examples may differ from what is described with respect to FIG. 5.

FIG. 6 is a diagram illustrating an example 600 of a control-plane protocol architecture for a UE that is configured with a sidelink signaling entity and a sidelink access stratum entity, in accordance with various aspects of the present disclosure. As shown in FIG. 6, and by reference number 610, the remote UE and the relay UE are configured with respective PC5-S and PC5-RRC entities. The PC5-RRC entities may handle AS communication between the remote UE and the relay UE, such as RRC connection setup, communication of capability information, AS-layer configuration, and/or the like. The PC5-RRC entity may be referred to herein as a sidelink access stratum entity, and the PC5-S entity may be referred to herein as a sidelink signaling entity.

As indicated above, FIG. 6 is provided as an example. Other examples may differ from what is described with respect to FIG. 6.

Figure 7:
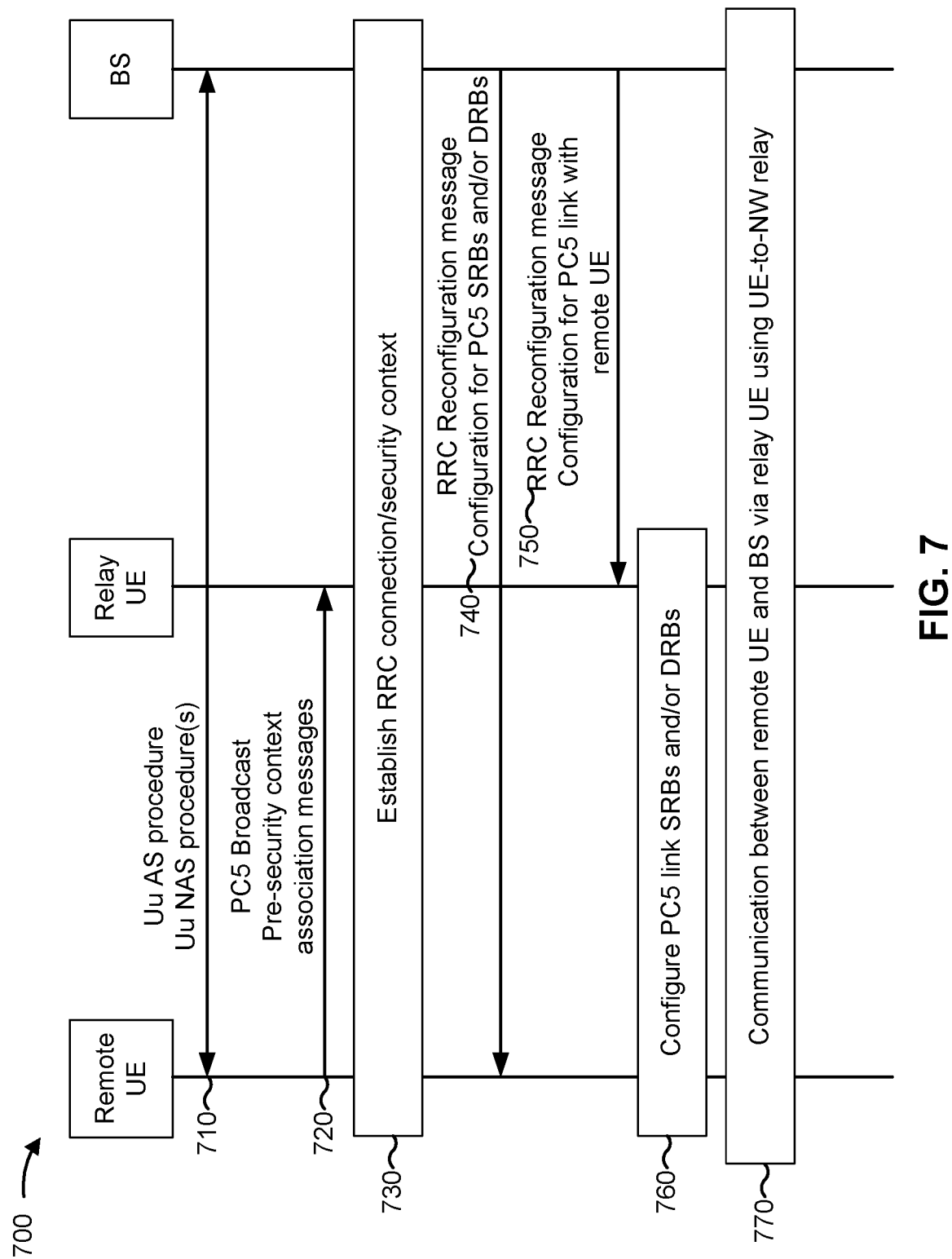
FIG. 7 is a diagram illustrating an example of signaling for UE-to-network relaying for a remote UE that is not configured with a sidelink signaling entity or a sidelink access stratum entity, in accordance with various aspects of the present disclosure.

FIG. 7 is a diagram illustrating an example 700 of signaling for UE-to-network relaying for a remote UE that is not configured with a sidelink signaling entity or a sidelink access stratum entity, in accordance with various aspects of the present disclosure. In some aspects, example 700 may be implemented using the protocol architectures shown in FIGS. 3 and 4. As shown in FIG. 7, example 700 includes a remote UE (e.g., UE 120, the remote UE associated with the protocol architecture shown by reference number 310, the remote UE associated with the protocol architecture shown by reference number 410, and/or the like), a relay UE (e.g., UE 120, the relay UE associated with the protocol architecture shown by reference number 320, the relay UE associated with the protocol architecture shown by reference number 420, and/or the like), and a base station (e.g., BS 110, the network, and/or the like).

As shown in FIG. 7, and by reference number 710, the remote UE and/or the relay UE may perform an AS procedure and/or one or more NAS procedures. For example, the remote UE and/or the relay UE may perform the AS procedure and/or the one or more NAS procedures using Uu interfaces of the remote UE and/or the relay UE. In some aspects, the AS procedure may be associated with transitioning from an idle mode (e.g., an RRC idle mode) to a connected mode (e.g., an RRC connected mode). For example, the remote UE may perform a Uu AS procedure specified in 3GPP Technical Specification (TS) 38.300 via the relay UE. Additionally, or alternatively, the remote UE may perform a Uu registration procedure or another type of Uu NAS procedure via the relay UE over an established NAS/AS security context setup.

As shown by reference number 720, the remote UE may transmit a pre-security context association message to the relay UE using a broadcast message. A pre-security context association message may include any message associated with establishing an RRC connection or an AS security context between the remote UE and the base station. For example, the pre-security context association message may include information associated with establishing an RRC connection between the remote UE and the base station for communication via the relay UE.

In some aspects, the broadcast message may be directed to the relay UE. In some aspects, the broadcast message may be transmitted using a PC5 interface or a sidelink interface using one or more signaling radio bearers (SRBs) allocated for broadcasting the broadcast message over a sidelink broadcast control channel (SBCCH) of the PC5 interface. In some aspects, the broadcast message may be directed to the relay UE based at least in part on the broadcast message indicating a Layer 2 identifier of the relay UE. By transmitting the information associated with configuring a security context using the broadcast message, communication of the information associated with configuring a security context between the remote UE and the relay UE is enabled for UEs not associated with a PC5-S interface or another type of sidelink interface.

As shown by reference number 730, the remote UE may establish the RRC connection and/or set up the security context with the base station via the relay UE. For example, the remote UE may establish the RRC connection and/or set up the AS security context based at least in part on the pre-security context association messages.

As shown by reference number 740, the base station may provide an RRC reconfiguration message to the relay UE. Additionally, or alternatively, as shown by reference number 750, the base station may provide an RRC reconfiguration message to the remote UE (e.g., via the relay UE). In some aspects, these RRC reconfiguration messages may be Uu RRC reconfiguration messages. In some aspects, the RRC reconfiguration message to the remote UE may identify a configuration to be used for a PC5 signaling radio bearer (SRB) or a PC5 data radio bearer (DRB) specific to the AS connection (e.g., the RRC connection). In some aspects, the RRC reconfiguration message to the relay UE may identify a configuration to be used for a PC5 link (e.g., a sidelink unicast link) between the relay UE and the remote UE.

As shown by reference number 760, the remote UE and the relay UE may configure a PC5 link (e.g., a sidelink unicast link) in accordance with one or more SRBs and/or DRBs indicated by the RRC reconfiguration messages. Additionally, or alternatively, the remote UE and the relay UE may configure the one or more SRBs and/or DRBs. As shown by reference number 770, the remote UE may communicate with the base station via the relay UE using UE-to-network relaying. For example, the relay UE may relay a communication from the remote UE to the base station or from the base station to the remote UE via the sidelink unicast link or the one or more radio bearers.

As indicated above, FIG. 7 is provided as an example. Other examples may differ from what is described with respect to FIG. 7.

FIG. 8 is a diagram illustrating an example 800 of signaling for UE-to-network relaying for a remote UE that is configured with a sidelink signaling entity, in accordance with various aspects of the present disclosure. As shown in FIG. 8, and by reference number 810, in example 800, the remote UE and the relay UE may be associated with respective PC5-S entities.

As shown by reference number 820, the remote UE and the relay UE may establish a PC5 sidelink unicast link (sometimes referred to herein as a sidelink interface or a PC5 link) and may set up security associated with the PC5 sidelink unicast link. For example, the remote UE and the relay UE may set up the PC5 sidelink unicast link and the security using PC5-S signaling (e.g., one or more sidelink signaling interface messages), such as in accordance with Section 5.4.5 of 3GPP TS 23.303 and/or Section 6.3.3.1 of 3GPP TS 23.287. In this way, RRC messages communicated between the remote UE and the base station may have hop-by-hop security.

As shown by reference number 830, the remote UE may provide an RRC message to the relay UE. For example, the RRC message may be an RRC connection request. As further shown, the RRC message may be encapsulated in a transparent container in a PC5-S message (e.g., transparent to the relay UE). In some aspects, the PC5-S message may be an existing PC5-S message, or may be a PC5-S message specific to transmitting the RRC message (e.g., a RemoteUE-Uu-UL-Transfer message or a RemoteUE-Uu-DL-Transfer message). In this case, the PC5-S entity of the relay UE may pass the transparent container to the adaptation layer of the relay UE, and the adaptation layer of the relay UE may transmit the transparent container to the base station over the Uu interface.

As shown by reference numbers 840 and 850, the BS 110 may provide one or more RRC reconfiguration messages to the remote UE and/or the relay UE. As shown by reference number 860, the RRC reconfiguration message provided to the remote UE may be provided via the relay UE. For example, the relay UE may provide the RRC reconfiguration message in a PC5-S message and/or the like. In some aspects, the RRC reconfiguration message may be provided in a transparent container. In some aspects, the one or more RRC reconfiguration messages may configure a PC5-AS stack of the remote UE and/or the relay UE for the PC5 sidelink unicast link, or may configure the PC5 sidelink unicast link. As shown by reference number 870, the remote UE and/or the relay UE may configure the PC5 sidelink unicast link and/or the security for the PC5 sidelink unicast link based at least in part on the RRC reconfiguration messages indicated by reference numbers 830 and 840.

In some aspects, the base station may send a single RRC reconfiguration message to the relay UE. The RRC reconfiguration message may include a sidelink interface configuration information element for AS configuration by the relay UE and a transparent container for the remote UE's sidelink interface configuration information element for AS configuration. The relay UE may then include the transparent container in a PC5-S message to the remote UE.

As indicated above, FIG. 8 is provided as an example. Other examples may differ from what is described with respect to FIG. 8.

FIG. 9 is a diagram illustrating an example 900 of signaling for UE-to-network relaying for a remote UE that is configured with a sidelink signaling entity, in accordance with various aspects of the present disclosure. As shown in FIG. 9, and by reference number 910, in example 900, the remote UE and the relay UE may be associated with respective PC5-S entities. In example 900, the remote UE and the relay UE do not setup a unicast link using PC5-S. Instead, the remote UE and the relay UE may use the PC5-S message for transporting the RRC message. In this case, no PC5 link security is used for the RRC message, which may conserve computing resources at the cost of diminished security relative to example 800.

As shown in FIG. 9, and by reference number 910, the remote UE may provide an RRC message to the relay UE in a PC5-S message with a transparent container. For example, the RRC message may be a Uu-RRC+PDCP message from the remote UE. The PC5-S message may be a dedicated PC5-S message, such as a RemoteUE-Relay-Comm-Req message. As shown by reference number 930, the relay UE may forward the RRC message to the base station. For example, the relay UE may determine that the PC5-S message includes content that is to be forwarded to the base station. Therefore, the relay UE's PC5-S entity may pass the embedded RRC message to the relay UE's adaptation layer, and the adaptation layer may route the embedded RRC message to the base station over the Uu interface.

As shown by reference number 940, the relay UE may set up a context for the remote UE. For example, on receiving a PC5-S message from a remote UE for which no context is available at the relay UE, the relay UE may set up a context for the remote UE to assist with downlink forwarding of data from the base station. In some aspects, "setting up the context" may refer to storing a Layer 2 identifier of the remote UE and an association of the forwarded message (e.g., an adaptation layer index). As shown by reference number 950, the relay UE may receive a communication directed to the remote UE (e.g., based at least in part on the adaptation layer index or the Layer 2 identifier). Accordingly, as shown by reference number 960, the relay UE may forward the communication to the remote UE based at least in part on the context.

As indicated above, FIG. 9 is provided as an example. Other examples may differ from what is described with respect to FIG. 9.

FIG. 10 is a diagram illustrating an example 1000 of signaling for UE-to-network relaying for a remote UE that is configured with a sidelink signaling entity and a sidelink access stratum entity, in accordance with various aspects of the present disclosure. As shown in FIG. 10, and by reference number 1010, in example 1000, the remote UE and the relay UE are associated with PC5-S entities and PC5-RRC entities.

As shown in FIG. 10, and by reference number 1020, the relay UE and the remote UE may establish a PC5 sidelink unicast link. In some aspects, the relay UE and the remote UE may establish the PC5 sidelink unicast link using NR V2X unicast link setup procedures. For example, security and an access stratum configuration of the PC5 sidelink unicast link may be configured as part of the NR V2X unicast link setup procedure. As shown by reference number 1020, the relay UE and the remote UE may configure one or more AS-layer parameters for the PC5 sidelink unicast link. For example, the relay UE and the remote UE may establish the PC5 sidelink unicast link and configure the one or more AS-layer parameters using the PC5-S entities and the PC5-RRC entities, respectively.

As shown by reference number 1030, the remote UE may provide an RRC message to the relay UE in a PC5-S message using a transparent container. Accordingly, the relay UE may relay the RRC message to the base station, as described in more detail elsewhere herein. As shown by reference numbers 1040 and 1050, the base station may provide RRC reconfiguration messages to the relay UE and/or the remote UE indicating a configuration for the PC5 sidelink unicast link. Accordingly, as shown by reference number 1060, the relay UE and the remote UE may configure the PC5 sidelink unicast link based at least in part on the RRC reconfiguration messages. In some aspects, an NR-RRC entity of the relay UE or the remote UE may pass an RRC reconfiguration message to a PC5-RRC entity of the relay UE or the remote UE, and the PC5-RRC entity may modify the configuration of the PC5 sidelink unicast link.

As indicated above, FIG. 10 is provided as an example. Other examples may differ from what is described with respect to FIG. 10.

Figure 11:
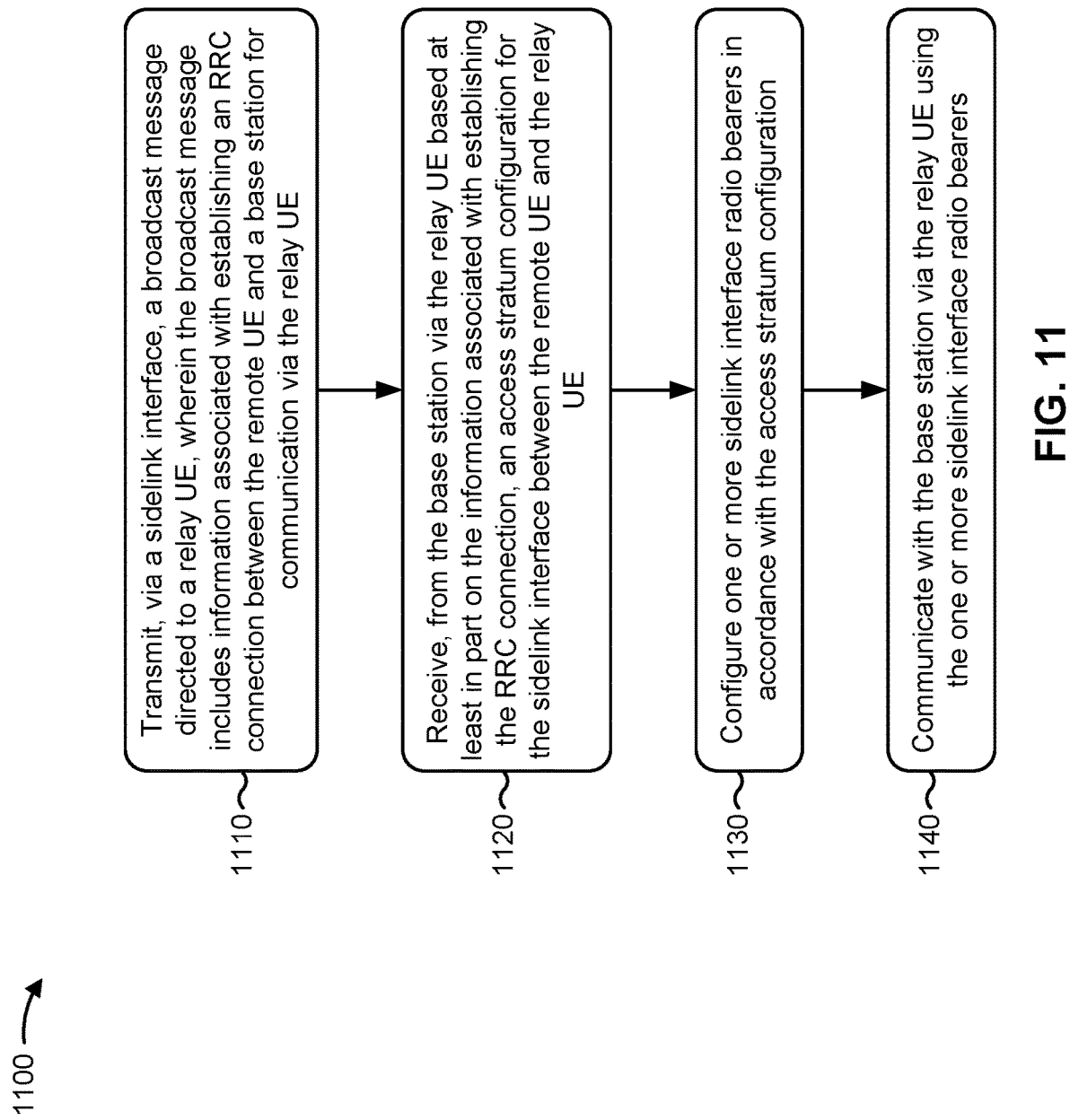
FIGS. 11-18 are diagrams illustrating example processes performed, for example, by a user equipment, in accordance with various aspects of the present disclosure.

FIG. 11 is a diagram illustrating an example process 1100 performed, for example, by a remote UE, in accordance with various aspects of the present disclosure. Example process 1100 is an example where the remote UE (e.g., the remote UE associated with the protocol architecture shown by reference number 310, the remote UE associated with the protocol architecture shown by reference number 410, UE 120, the remote UE shown in FIGS. 7-10, and/or the like) performs operations associated with a UE-to-network relay.

As shown in FIG. 11, in some aspects, process 1100 may include transmitting, via a sidelink interface, a broadcast message directed to a relay UE, wherein the broadcast message includes information associated with establishing an RRC connection between the remote UE and a base station for communication via the relay UE (block 1110). For example, the remote UE (e.g., using controller/processor 280, transmit processor 264, TX MIMO processor 266, MOD 254, antenna 252, and/or the like) may transmit, via a sidelink interface, a broadcast message directed to a relay UE, as described above. In some aspects, the broadcast message includes information associated with establishing an RRC connection between the remote UE and a base station for communication via the relay UE.

As further shown in FIG. 11, in some aspects, process 1100 may include receiving, from the base station via the relay UE based at least in part on the information associated with establishing the RRC connection, an access stratum configuration for the sidelink interface between the remote UE and the relay UE (block 1120). For example, the remote UE (e.g., using antenna 252, DEMOD 254, MIMO detector 256, receive processor 258, controller/processor 280, and/or the like) may receive, from the base station via the relay UE based at least in part on the information associated with establishing the RRC connection, an access stratum configuration for the sidelink interface between the remote UE and the relay UE, as described above.

As further shown in FIG. 11, in some aspects, process 1100 may include configuring one or more sidelink interface radio bearers in accordance with the access stratum configuration (block 1130). For example, the remote UE (e.g., using controller/processor 280, transmit processor 264, TX MIMO processor 266, MOD 254, antenna 252, and/or the like) may configure one or more sidelink interface radio bearers in accordance with the access stratum configuration, as described above.

As further shown in FIG. 11, in some aspects, process 1100 may include communicating with the base station via the relay UE using the one or more sidelink interface radio bearers (block 1140). For example, the remote UE (e.g., using controller/processor 280, transmit processor 264, TX MIMO processor 266, MOD 254, antenna 252, and/or the like) may communicate with the base station via the relay UE using the one or more sidelink interface radio bearers, as described above.

Process 1100 may include additional aspects, such as any single aspect or any combination of aspects described below and/or in connection with one or more other processes described elsewhere herein.

In a first aspect, the access stratum configuration includes at least one of a radio bearer configuration information element for the one or more sidelink interface radio bearers, a discontinuous reception (DRX) configuration information element, or a resource allocation information element.

In a second aspect, alone or in combination with the first aspect, the access stratum configuration is received in a sidelink interface configuration information element in an RRC reconfiguration message.

In a third aspect, alone or in combination with one or more of the first and second aspects, the sidelink interface is a ProSe Sidelink (PC5) interface.

In a fourth aspect, alone or in combination with one or more of the first through third aspects, the broadcast message is an RRC message and is transmitted using a signaling radio bearer on a sidelink broadcast control channel.

In a fifth aspect, alone or in combination with one or more of the first through fourth aspects, the broadcast message is directed to the relay UE based at least in part on a Layer 2 identifier of the relay UE.

In a sixth aspect, alone or in combination with one or more of the first through fifth aspects, the one or more sidelink interface radio bearers comprise one or more signaling radio bearers or one or more data radio bearers for a unicast access stratum connection between the remote UE and the relay UE.

In a seventh aspect, alone or in combination with one or more of the first through sixth aspects, the access stratum configuration includes information indicating a DRX configuration or information indicating a resource allocation configuration.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
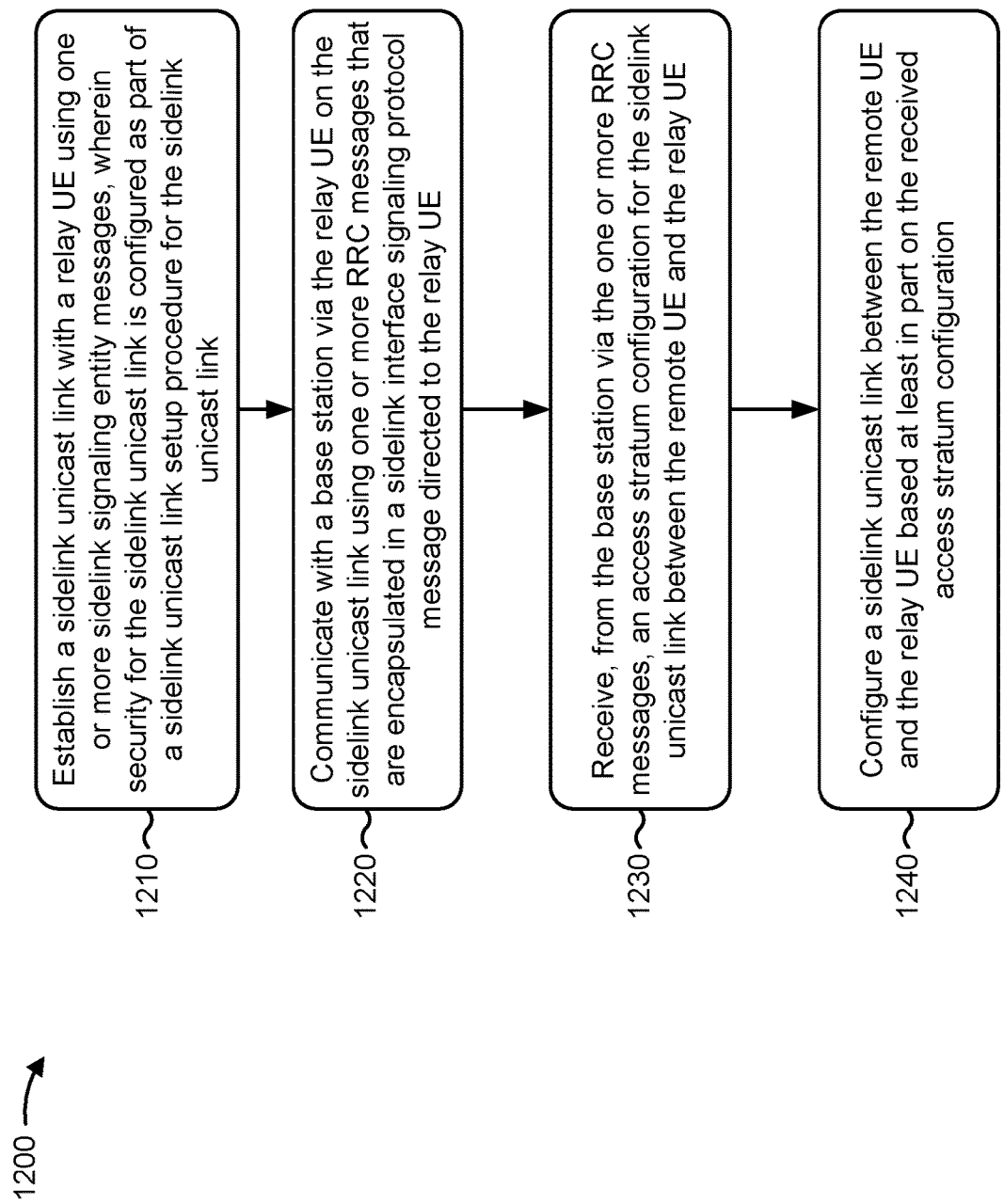

FIG. 12 is a diagram illustrating an example process 1200 performed, for example, by a remote UE, in accordance with various aspects of the present disclosure. Example process 1200 is an example where the remote UE (e.g., the remote UE associated with the protocol architecture shown by reference number 310, the remote UE associated with the protocol architecture shown by reference number 410, UE 120, the remote UE shown in FIGS. 7-10, and/or the like) performs operations associated with a UE-to-network relay.

As shown in FIG. 12, in some aspects, process 1200 may include establishing a sidelink unicast link with a relay UE using one or more sidelink signaling messages, wherein security for the sidelink unicast link is configured as part of a sidelink unicast link setup procedure for the sidelink unicast link (block 1210). For example, the remote UE (e.g., using controller/processor 280, transmit processor 264, TX MIMO processor 266, MOD 254, antenna 252, and/or the like) may establish a sidelink unicast link with a relay UE using one or more sidelink signaling messages, as described above. In some aspects, security for the sidelink unicast link is configured as part of a sidelink unicast link setup procedure for the sidelink unicast link.

As further shown in FIG. 12, in some aspects, process 1200 may include communicating with a base station via the relay UE on the sidelink unicast link using one or more RRC messages that are encapsulated in a sidelink interface signaling protocol message directed to the relay UE (block 1220). For example, the remote UE (e.g., using controller/processor 280, transmit processor 264, TX MIMO processor 266, MOD 254, antenna 252, and/or the like) may communicate with a base station via the relay UE on the sidelink unicast link using one or more RRC messages that are encapsulated in a sidelink interface signaling protocol message directed to the relay UE, as described above.

As further shown in FIG. 12, in some aspects, process 1200 may include receiving, from the base station via the one or more RRC messages, an access stratum configuration for the sidelink unicast link between the remote UE and the relay UE (block 1230). For example, the remote UE (e.g., using antenna 252, DEMOD 254, MIMO detector 256, receive processor 258, controller/processor 280, and/or the like) may receive, from the base station via the one or more RRC messages, an access stratum configuration for the sidelink unicast link between the remote UE and the relay UE, as described above.

As further shown in FIG. 12, in some aspects, process 1200 may include configuring a sidelink unicast link between the remote UE and the relay UE based at least in part on the received access stratum configuration (block 1240). For example, the remote UE (e.g., using controller/processor 280, transmit processor 264, TX MIMO processor 266, MOD 254, antenna 252, and/or the like) may configure a sidelink unicast link between the remote UE and the relay UE based at least in part on the received access stratum configuration, as described above.

Process 1200 may include additional aspects, such as any single aspect or any combination of aspects described below and/or in connection with one or more other processes described elsewhere herein.

In a first aspect, the access stratum configuration includes at least one of a radio bearer configuration information element for one or more sidelink interface radio bearers of the sidelink unicast link, a DRX configuration information element, or a resource allocation information element.

In a second aspect, alone or in combination with the first aspect, the access stratum configuration is received in a sidelink interface configuration information element in an RRC reconfiguration message.

In a third aspect, alone or in combination with one or more of the first and second aspects, the unicast sidelink interface is a PC5 interface.

In a fourth aspect, alone or in combination with one or more of the first through third aspects, the remote UE is associated with a sidelink interface signaling protocol entity.

In a fifth aspect, alone or in combination with one or more of the first through fourth aspects, the access stratum configuration includes information indicating a DRX configuration or information indicating a resource allocation configuration.

In a sixth aspect, alone or in combination with one or more of the first through fifth aspects, process 1200 may include receiving, from the base station via the relay UE, an RRC reconfiguration message directed to the remote UE that is encapsulated in a transparent container, wherein the RRC reconfiguration message is received in a sidelink interface signaling protocol message directed to the remote UE.

In a seventh aspect, alone or in combination with one or more of the first through sixth aspects, the RRC reconfiguration message directed to the remote UE is received with an RRC reconfiguration message that is directed to the relay UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
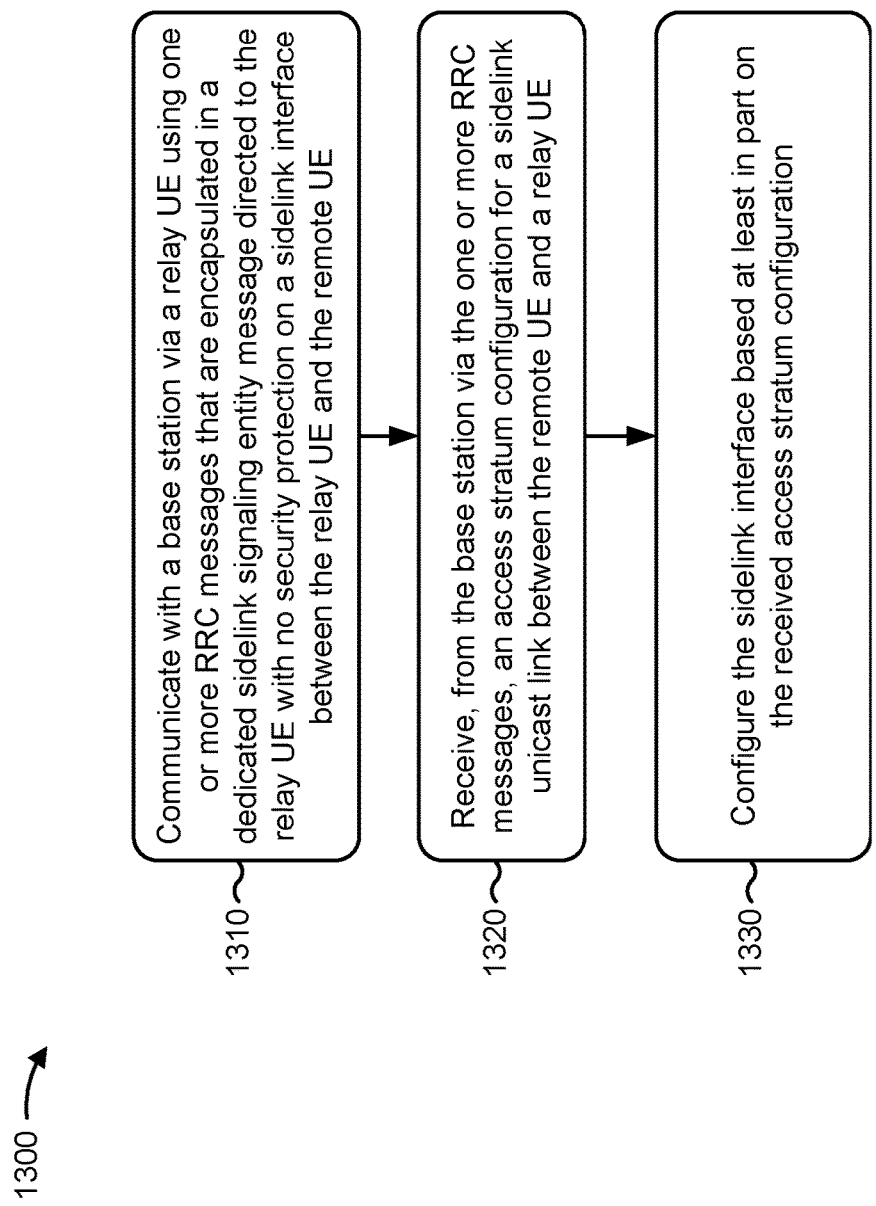

FIG. 13 is a diagram illustrating an example process 1300 performed, for example, by a remote UE, in accordance with various aspects of the present disclosure. Example process 1300 is an example where the remote UE (e.g., the remote UE associated with the protocol architecture shown by reference number 310, the remote UE associated with the protocol architecture shown by reference number 410, UE 120, the remote UE shown in FIGS. 7-10, and/or the like) performs operations associated with a UE-to-network relay.

As shown in FIG. 13, in some aspects, process 1300 may include communicating with a base station via a relay UE using one or more RRC messages that are encapsulated in a dedicated sidelink signaling message directed to the relay UE without sidelink interface security protection (block 1310). For example, the remote UE (e.g., using controller/processor 280, transmit processor 264, TX MIMO processor 266, MOD 254, antenna 252, and/or the like) may communicate with a base station via a relay UE using one or more RRC messages that are encapsulated in a dedicated sidelink signaling message directed to the relay UE without sidelink interface security protection, as described above.

As further shown in FIG. 13, in some aspects, process 1300 may include receiving, from the base station via the one or more RRC messages, an access stratum configuration for a sidelink unicast link between the remote UE and a relay UE (block 1320). For example, the remote UE (e.g., using antenna 252, DEMOD 254, MIMO detector 256, receive processor 258, controller/processor 280, and/or the like) may receive, from the base station via the one or more RRC messages, an access stratum configuration for a sidelink unicast link between the remote UE and a relay UE, as described above.

As further shown in FIG. 13, in some aspects, process 1300 may include configuring the sidelink interface based at least in part on the received access stratum configuration (block 1330). For example, the remote UE (e.g., using controller/processor 280, transmit processor 264, TX MIMO processor 266, MOD 254, antenna 252, and/or the like) may configure the sidelink interface based at least in part on the received access stratum configuration, as described above.

Process 1300 may include additional aspects, such as any single aspect or any combination of aspects described below and/or in connection with one or more other processes described elsewhere herein.

In a first aspect, the access stratum configuration includes information indicating a DRX configuration or information indicating a resource allocation configuration.

In a second aspect, alone or in combination with the first aspect, the access stratum configuration includes information associated with a setup of one or more radio bearers for communication between the remote UE and the relay UE over the sidelink interface.

In a third aspect, alone or in combination with one or more of the first and second aspects, the remote UE is associated with a sidelink signaling protocol entity (PC5-S).

In a fourth aspect, alone or in combination with one or more of the first through third aspects, the dedicated sidelink signaling message comprises a message associated with a ProSe Sidelink signaling protocol entity.

In a fifth aspect, alone or in combination with one or more of the first through fourth aspects, the dedicated sidelink signaling message is directed to the relay UE based at least in part on a Layer 2 identifier of the relay UE.

In a sixth aspect, alone or in combination with one or more of the first through fifth aspects, the access stratum configuration includes at least one of a radio bearer configuration information element for one or more sidelink interface radio bearers of the sidelink unicast link, a DRX configuration information element, or a resource allocation information element.

In a seventh aspect, alone or in combination with one or more of the first through sixth aspects, the access stratum configuration is received in a sidelink interface configuration information element in an RRC reconfiguration message.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
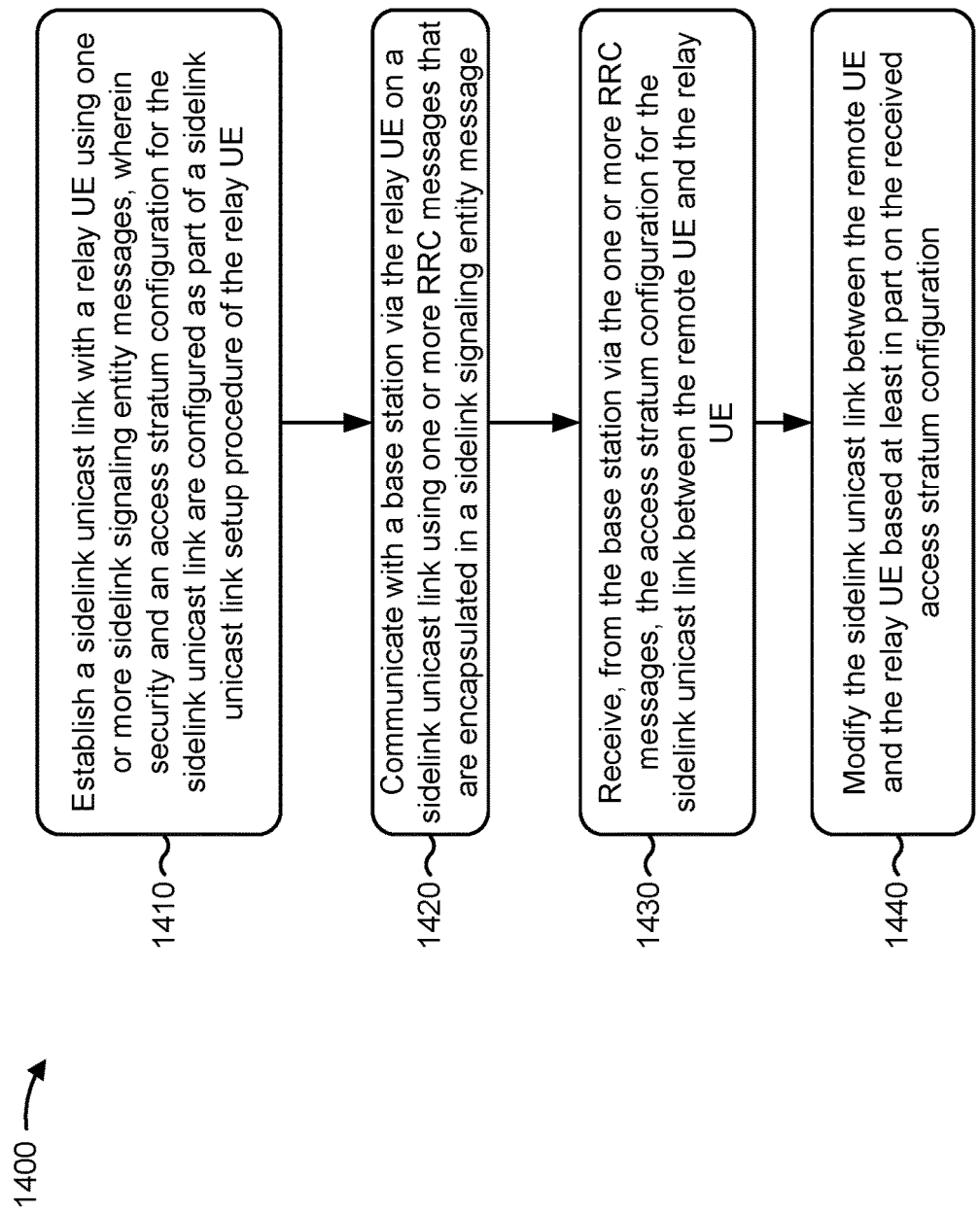

FIG. 14 is a diagram illustrating an example process 1400 performed, for example, by a remote UE, in accordance with various aspects of the present disclosure. Example process 1400 is an example where the remote UE (e.g., the remote UE associated with the protocol architecture shown by reference number 310, the remote UE associated with the protocol architecture shown by reference number 410, UE 120, the remote UE shown in FIGS. 7-10, and/or the like) performs operations associated with a UE-to-network relay.

As shown in FIG. 14, in some aspects, process 1400 may include establishing a sidelink unicast link with a relay UE using one or more sidelink signaling messages, wherein security and an access stratum configuration for the sidelink unicast link are configured as part of a sidelink unicast link setup procedure of the relay UE (block 1410). For example, the remote UE (e.g., using controller/processor 280, transmit processor 264, TX MIMO processor 266, MOD 254, antenna 252, and/or the like) may establish a sidelink unicast link with a relay UE using one or more sidelink signaling messages, as described above. In some aspects, security and an access stratum configuration for the sidelink unicast link are configured as part of a sidelink unicast link setup procedure of the relay UE.

As further shown in FIG. 14, in some aspects, process 1400 may include communicating with a base station via the relay UE on a sidelink unicast link using one or more RRC messages that are encapsulated in a sidelink signaling message (block 1420). For example, the remote UE (e.g., using controller/processor 280, transmit processor 264, TX MIMO processor 266, MOD 254, antenna 252, and/or the like) may communicate with a base station via the relay UE on a sidelink unicast link using one or more RRC messages that are encapsulated in a sidelink signaling message, as described above.

As further shown in FIG. 14, in some aspects, process 1400 may include receiving, from the base station via the one or more RRC messages, the access stratum configuration for the sidelink unicast link between the remote UE and the relay UE (block 1430). For example, the remote UE (e.g., using antenna 252, DEMOD 254, MIMO detector 256, receive processor 258, controller/processor 280, and/or the like) may receive, from the base station via the one or more RRC messages, the access stratum configuration for the sidelink unicast link between the remote UE and the relay UE, as described above.

As further shown in FIG. 14, in some aspects, process 1400 may include modifying the sidelink unicast link between the remote UE and the relay UE based at least in part on the received access stratum configuration (block 1440). For example, the remote UE (e.g., using controller/processor 280, transmit processor 264, TX MIMO processor 266, MOD 254, antenna 252, and/or the like) may modify the sidelink unicast link between the remote UE and the relay UE based at least in part on the received access stratum configuration, as described above.

Process 1400 may include additional aspects, such as any single aspect or any combination of aspects described below and/or in connection with one or more other processes described elsewhere herein.

In a first aspect, the remote UE is associated with a sidelink signaling protocol entity (PC5-S) and a sidelink access stratum protocol entity (PC5-RRC).

In a second aspect, alone or in combination with the first aspect, the access stratum configuration includes at least one of a radio bearer configuration information element for one or more sidelink interface radio bearers of the sidelink unicast link, a DRX configuration information element, or a resource allocation information element.

In a third aspect, alone or in combination with one or more of the first and second aspects, the access stratum configuration is received in a sidelink interface configuration information element in an RRC reconfiguration message.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
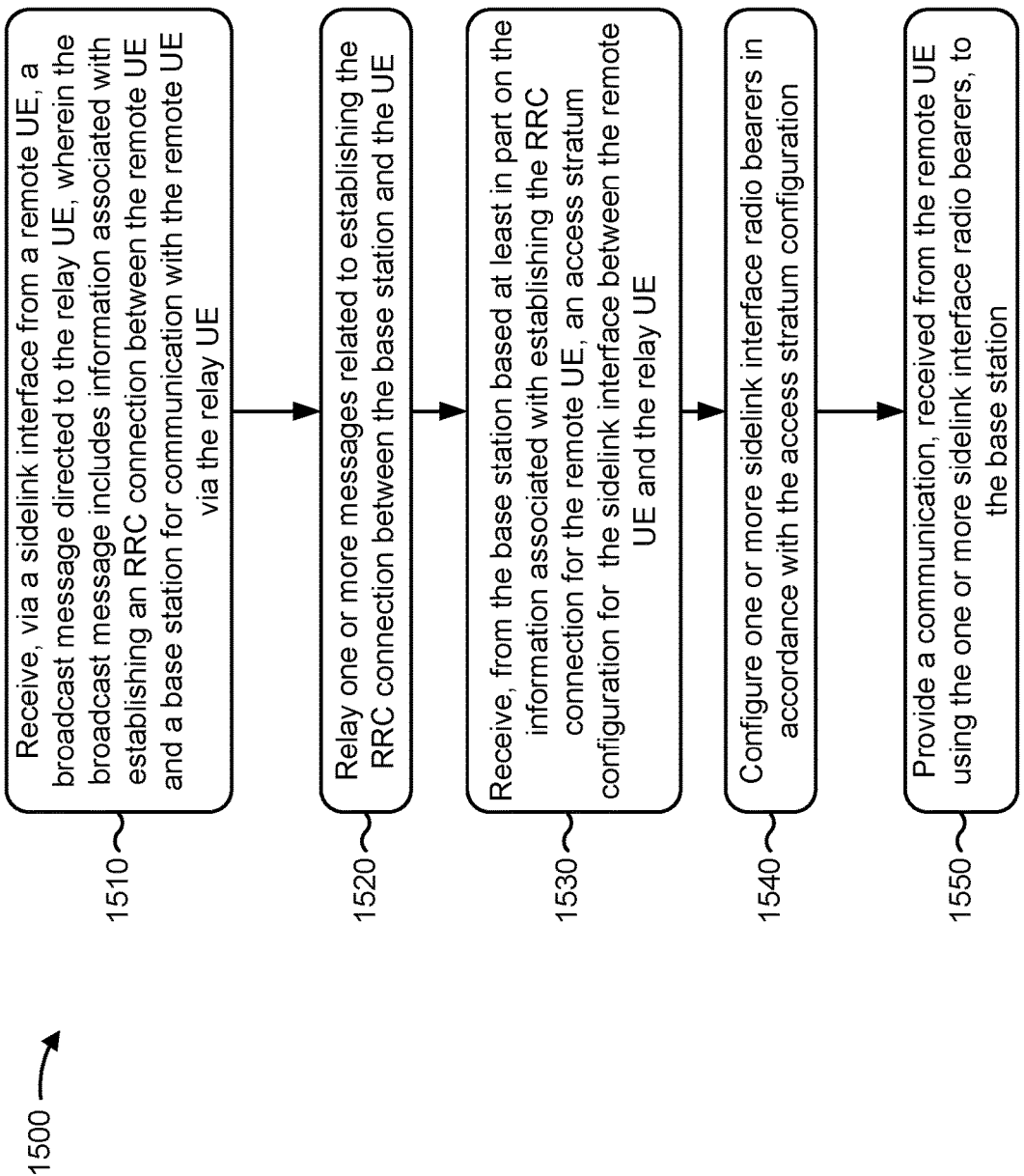

FIG. 15 is a diagram illustrating an example process 1500 performed, for example, by a relay UE, in accordance with various aspects of the present disclosure. Example process 1500 is an example where the relay UE (e.g., the relay UE associated with the protocol architecture shown by reference number 320, the relay UE associated with the protocol architecture shown by reference number 420, UE 120, the relay UEs shown in FIGS. 7-10, and/or the like) performs operations associated with a UE-to-network relay.

As shown in FIG. 15, in some aspects, process 1500 may include receiving, via a sidelink interface from a remote UE, a broadcast message directed to the relay UE, wherein the broadcast message includes information associated with establishing an RRC connection between the remote UE and a base station for communication with the remote UE via the relay UE (block 1510). For example, the relay UE (e.g., using antenna 252, DEMOD 254, MIMO detector 256, receive processor 258, controller/processor 280, and/or the like) may receive, via a sidelink interface from a remote UE, a broadcast message directed to the relay UE, as described above. In some aspects, the broadcast message includes information associated with establishing an RRC connection between the remote UE and a base station for communication with the remote UE via the relay UE.

As further shown in FIG. 15, in some aspects, process 1500 may include relaying one or more messages related to establishing the RRC connection between the base station and the remote UE (block 1520). For example, the relay UE (e.g., using controller/processor 280, transmit processor 264, TX MIMO processor 266, MOD 254, antenna 252, and/or the like) may relay one or more messages related to establishing the RRC connection between the base station and the remote UE, as described above.

As further shown in FIG. 15, in some aspects, process 1500 may include receiving, from the base station based at least in part on the information associated with establishing the RRC connection for the remote UE, an access stratum configuration for the sidelink interface between the remote UE and the relay UE (block 1530). For example, the relay UE (e.g., using antenna 252, DEMOD 254, MIMO detector 256, receive processor 258, controller/processor 280, and/or the like) may receive, from the base station based at least in part on the information associated with establishing the RRC connection, an access stratum configuration for the sidelink interface between the remote UE and the relay UE, as described above.

As further shown in FIG. 15, in some aspects, process 1500 may include configuring one or more sidelink interface radio bearers in accordance with the access stratum configuration (block 1540). For example, the relay UE (e.g., using controller/processor 280, transmit processor 264, TX MIMO processor 266, MOD 254, antenna 252, and/or the like) may configure one or more sidelink interface radio bearers in accordance with the access stratum configuration, as described above.

As further shown in FIG. 15, in some aspects, process 1500 may include providing a communication, received from the remote UE using the one or more sidelink interface radio bearers, to the base station (block 1550). For example, the relay UE (e.g., using controller/processor 280, transmit processor 264, TX MIMO processor 266, MOD 254, antenna 252, and/or the like) may provide a communication, received from the remote UE using the one or more sidelink interface radio bearers, to the base station, as described above.

Process 1500 may include additional aspects, such as any single aspect or any combination of aspects described below and/or in connection with one or more other processes described elsewhere herein.

In a first aspect, the sidelink interface is a ProSe Sidelink (PC5) interface.

In a second aspect, alone or in combination with the first aspect, the broadcast message is an RRC message and is received using a signaling radio bearer on a sidelink broadcast control channel.

In a third aspect, alone or in combination with one or more of the first and second aspects, the broadcast message is directed to the relay UE based at least in part on a Layer 2 identifier of the relay UE.

In a fourth aspect, alone or in combination with one or more of the first through third aspects, the one or more sidelink interface radio bearers comprise one or more signaling radio bearers or one or more data radio bearers for a unicast access stratum connection between the remote UE and the relay UE.

In a fifth aspect, alone or in combination with one or more of the first through fourth aspects, the access stratum configuration includes information indicating a DRX configuration or information indicating a resource allocation configuration.

In a sixth aspect, alone or in combination with one or more of the first through fifth aspects, the access stratum configuration includes at least one of a radio bearer configuration information element for the one or more sidelink interface radio bearers, a DRX configuration information element, or a resource allocation information element.

In a seventh aspect, alone or in combination with one or more of the first through sixth aspects, the access stratum configuration is received in a sidelink interface configuration information element in an RRC reconfiguration message.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
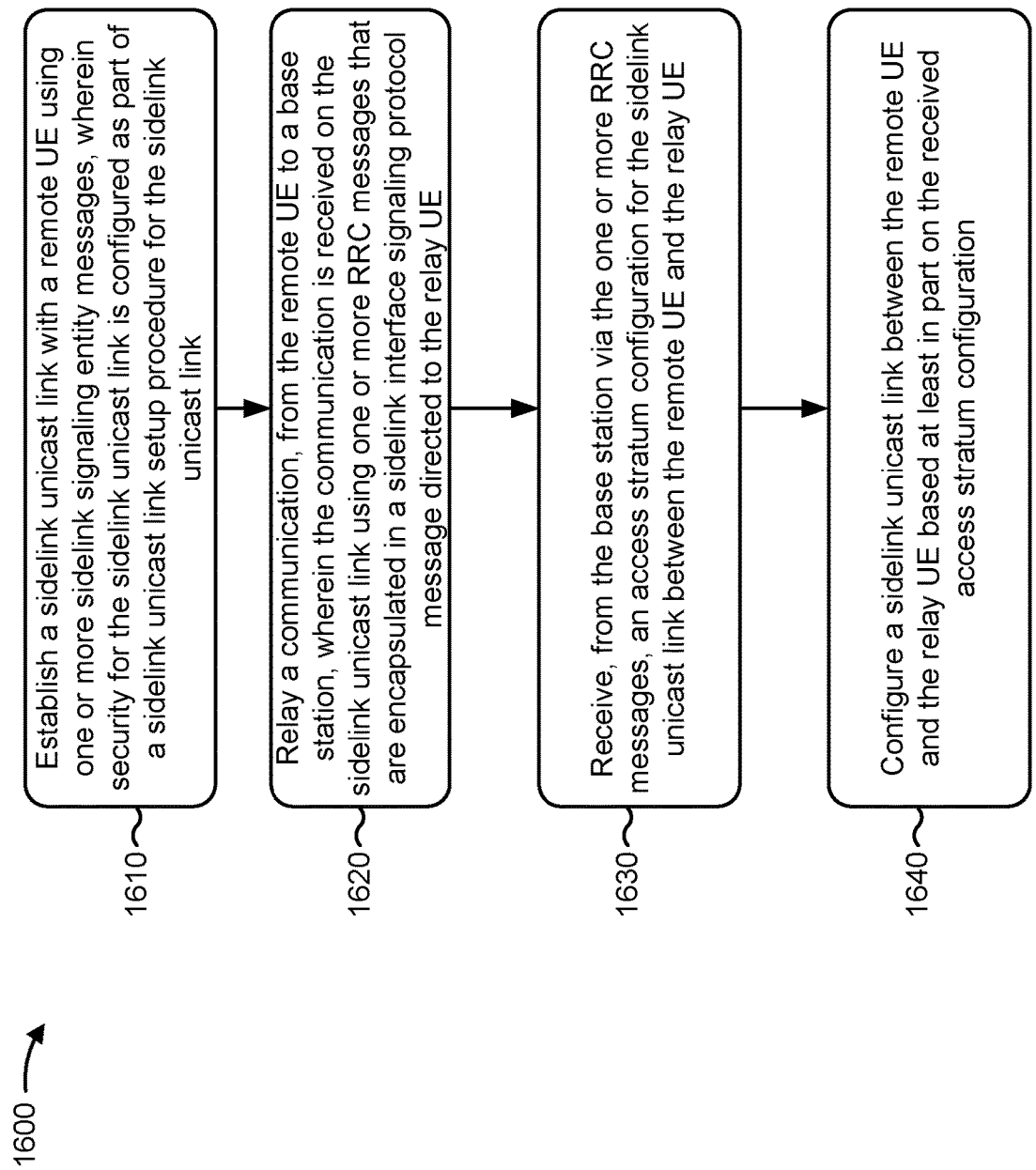

FIG. 16 is a diagram illustrating an example process 1600 performed, for example, by a relay UE, in accordance with various aspects of the present disclosure. Example process 1600 is an example where the relay UE (e.g., the relay UE associated with the protocol architecture shown by reference number 320, the relay UE associated with the protocol architecture shown by reference number 420, UE 120, the relay UEs shown in FIGS. 7-10, and/or the like) performs operations associated with a UE-to-network relay.

As shown in FIG. 16, in some aspects, process 1600 may include establishing a sidelink unicast link with a remote UE using one or more sidelink signaling messages, wherein security for the sidelink unicast link is configured as part of a sidelink unicast link setup procedure for the sidelink unicast link (block 1610). For example, the relay UE (e.g., using controller/processor 280, transmit processor 264, TX MIMO processor 266, MOD 254, antenna 252, and/or the like) may establish a sidelink unicast link with a remote UE using one or more sidelink signaling messages, as described above. In some aspects, security for the sidelink unicast link is configured as part of a sidelink unicast link setup procedure for the sidelink unicast link.

As further shown in FIG. 16, in some aspects, process 1600 may include relaying a communication, from the remote UE to a base station, wherein the communication is received on the sidelink unicast link using one or more RRC messages that are encapsulated in a sidelink interface signaling protocol message directed to the relay UE (block 1620). For example, the relay UE (e.g., using controller/processor 280, transmit processor 264, TX MIMO processor 266, MOD 254, antenna 252, and/or the like) may relay a communication, from the remote UE to a base station, as described above. In some aspects, the communication is received on the sidelink unicast link using one or more RRC messages that are encapsulated in a sidelink interface signaling protocol message directed to the relay UE.

As further shown in FIG. 16, in some aspects, process 1600 may include receiving, from the base station via the one or more RRC messages, an access stratum configuration for the sidelink unicast link between the remote UE and the relay UE (block 1630). For example, the relay UE (e.g., using antenna 252, DEMOD 254, MIMO detector 256, receive processor 258, controller/processor 280, and/or the like) may receive, from the base station via the one or more RRC messages, an access stratum configuration for the sidelink unicast link between the remote UE and the relay UE, as described above.

As further shown in FIG. 16, in some aspects, process 1600 may include configuring a sidelink unicast link between the remote UE and the relay UE based at least in part on the received access stratum configuration (block 1640). For example, the relay UE (e.g., using antenna 252, DEMOD 254, MIMO detector 256, receive processor 258, controller/processor 280, and/or the like) may configure a sidelink unicast link between the remote UE and the relay UE based at least in part on the received access stratum configuration, as described above.

Process 1600 may include additional aspects, such as any single aspect or any combination of aspects described below and/or in connection with one or more other processes described elsewhere herein.

In a first aspect, the unicast sidelink interface is a ProSe Sidelink (PC5) interface.

In a second aspect, alone or in combination with the first aspect, the relay UE is associated with a sidelink signaling entity, the sidelink signaling entity is configured to pass the sidelink signaling message to an adaptation layer of the relay UE, and relaying the communication further comprises providing, by the adaptation layer, the communication on a Uu interface of the relay UE.

In a third aspect, alone or in combination with one or more of the first and second aspects, the access stratum configuration includes at least one of a radio bearer configuration information element for one or more sidelink interface radio bearers of the sidelink unicast link, a DRX configuration information element, or a resource allocation information element.

In a fourth aspect, alone or in combination with one or more of the first through third aspects, the access stratum configuration is received in a sidelink interface configuration information element in an RRC reconfiguration message.

In a fifth aspect, alone or in combination with one or more of the first through fourth aspects, the unicast sidelink interface is a ProSe Sidelink (PC5) interface.

In a sixth aspect, alone or in combination with one or more of the first through fifth aspects, the remote UE is associated with a sidelink interface signaling protocol entity (PC5-S).

In a seventh aspect, alone or in combination with one or more of the first through sixth aspects, the access stratum configuration includes information indicating a DRX configuration or information indicating a resource allocation configuration.

In an eighth aspect, alone or in combination with one or more of the first through seventh aspects, process 1600 may include receiving, from the base station, a radio resource control (RRC) reconfiguration message directed to the remote UE that is encapsulated in a transparent container; and providing the RRC reconfiguration message in the transparent container to the remote UE in a sidelink interface signaling protocol message directed to the remote UE.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
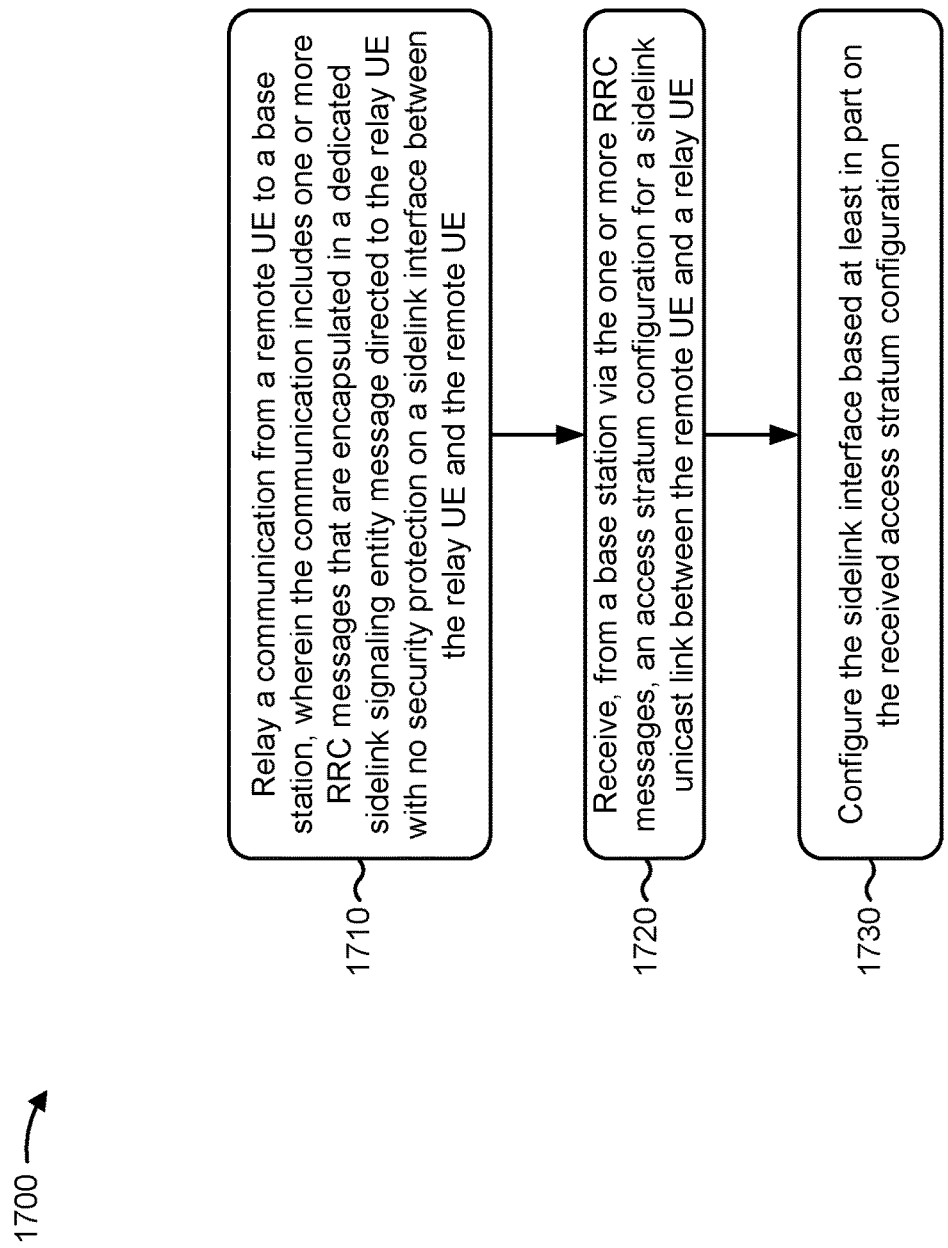

FIG. 17 is a diagram illustrating an example process 1700 performed, for example, by a relay UE, in accordance with various aspects of the present disclosure. Example process 1700 is an example where the relay UE (e.g., the relay UE associated with the protocol architecture shown by reference number 320, the relay UE associated with the protocol architecture shown by reference number 420, UE 120, the relay UEs shown in FIGS. 7-10, and/or the like) performs operations associated with a UE-to-network relay.

As shown in FIG. 17, in some aspects, process 1700 may include relaying a communication from a remote UE to a base station, wherein the communication includes one or more RRC messages that are encapsulated in a dedicated sidelink signaling message directed to the relay UE without sidelink interface security protection (block 1710). For example, the relay UE (e.g., using controller/processor 280, transmit processor 264, TX MIMO processor 266, MOD 254, antenna 252, and/or the like) may relay a communication from a remote UE to a base station, as described above. In some aspects, the communication includes one or more RRC messages that are encapsulated in a dedicated sidelink signaling message directed to the relay UE without sidelink interface security protection.

As further shown in FIG. 17, in some aspects, process 1700 may include receiving, from a base station via the one or more RRC messages, an access stratum configuration for a sidelink unicast link between the remote UE and a relay UE (block 1720). For example, the relay UE (e.g., using antenna 252, DEMOD 254, MIMO detector 256, receive processor 258, controller/processor 280, and/or the like) may receive, from a base station via the one or more RRC messages, an access stratum configuration for a sidelink unicast link between the remote UE and a relay UE, as described above.

As further shown in FIG. 17, in some aspects, process 1700 may include configuring the sidelink interface based at least in part on the received access stratum configuration (block 1730). For example, the relay UE (e.g., using controller/processor 280, transmit processor 264, TX MIMO processor 266, MOD 254, antenna 252, and/or the like) may configure the sidelink interface based at least in part on the received access stratum configuration, as described above.

Process 1700 may include additional aspects, such as any single aspect or any combination of aspects described below and/or in connection with one or more other processes described elsewhere herein.

In a first aspect, the relay UE is associated with a sidelink signaling entity, and the sidelink signaling entity is configured to pass the dedicated sidelink signaling message to an adaptation layer of the relay UE, and relaying the communication further comprises providing, by the adaptation layer, the communication on a Uu interface of the relay UE.

In a second aspect, alone or in combination with the first aspect, the access stratum configuration includes information associated with a setup of one or more radio bearers for communication between the remote UE and relay UE over the sidelink interface.

In a third aspect, alone or in combination with one or more of the first and second aspects, the remote UE is associated with a sidelink signaling entity protocol entity (PC5-S).

In a fourth aspect, alone or in combination with one or more of the first through third aspects, the dedicated sidelink signaling message comprises a message associated with a ProSe Sidelink signaling entity.

In a fifth aspect, alone or in combination with one or more of the first through fourth aspects, the dedicated sidelink signaling message is directed to the relay UE based at least in part on a Layer 2 identifier of the relay UE.

In a sixth aspect, alone or in combination with one or more of the first through fifth aspects, the access stratum configuration includes at least one of a radio bearer configuration information element for one or more sidelink interface radio bearers of the sidelink unicast link, a DRX configuration information element, or a resource allocation information element.

In a seventh aspect, alone or in combination with one or more of the first through sixth aspects, the access stratum configuration is received in a sidelink interface configuration information element in an RRC reconfiguration message.

In an eighth aspect, alone or in combination with one or more of the first through seventh aspects, relaying the communication further comprises relaying the communication from the base station to the remote UE based at least in part on the context.

In a ninth aspect, alone or in combination with one or more of the first through eighth aspects, the access stratum configuration includes information indicating a DRX configuration or information indicating a resource allocation configuration.

In a tenth aspect, alone or in combination with one or more of the first through ninth aspects, process 1700 may include receiving, from the base station, a radio resource control (RRC) reconfiguration message directed to the remote UE that is encapsulated in a transparent container; and providing the RRC reconfiguration message in the transparent container to the remote UE in a sidelink interface signaling protocol message directed to the remote UE.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
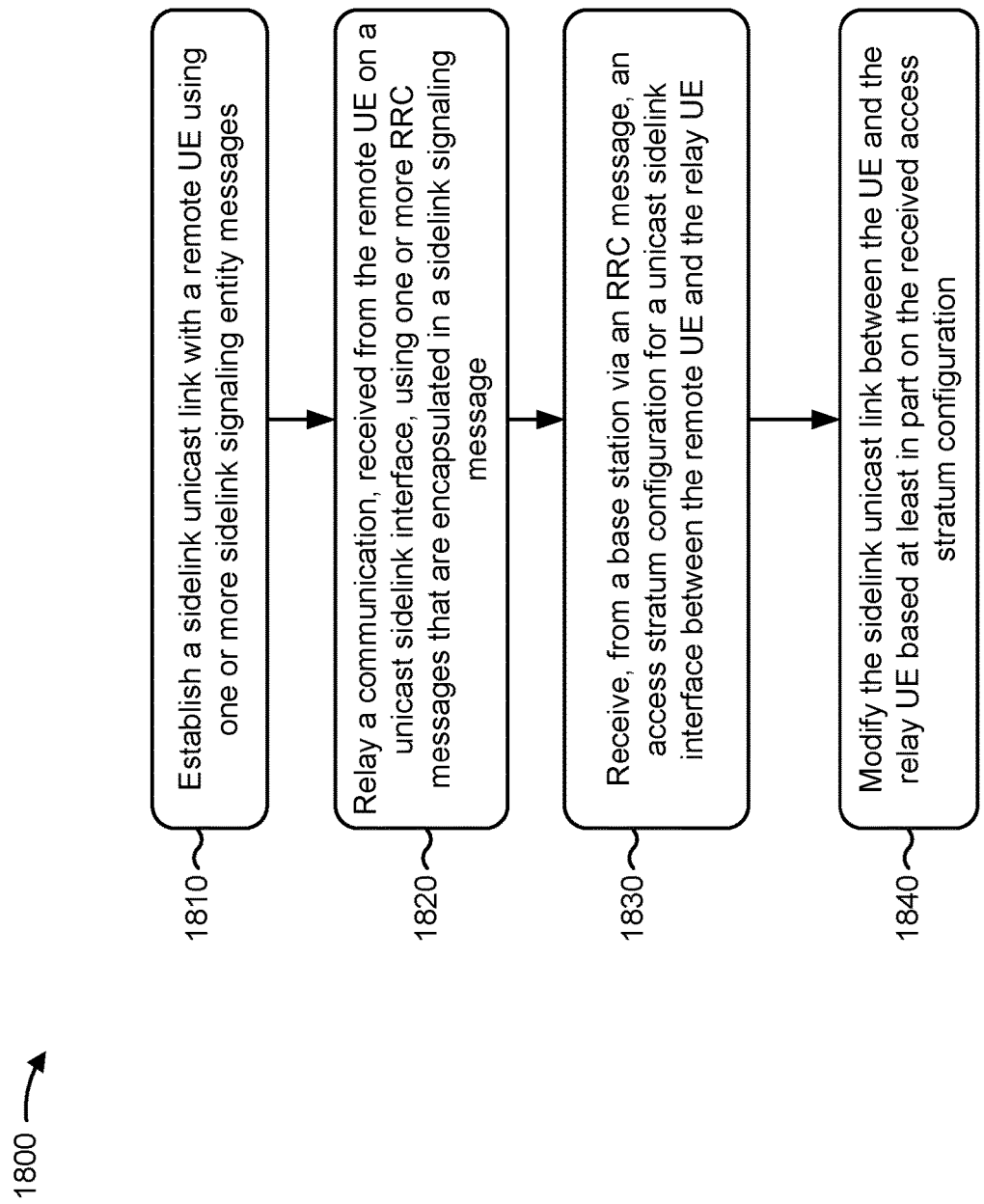

FIG. 18 is a diagram illustrating an example process 1800 performed, for example, by a relay UE, in accordance with various aspects of the present disclosure. Example process 1800 is an example where the relay UE (e.g., the relay UE associated with the protocol architecture shown by reference number 320, the relay UE associated with the protocol architecture shown by reference number 420, UE 120, the relay UEs shown in FIGS. 7-10, and/or the like) performs operations associated with a UE-to-network relay.

As shown in FIG. 18, in some aspects, process 1800 may include establishing a sidelink unicast link with a remote UE using one or more sidelink signaling messages (block 1810). For example, the relay UE (e.g., using controller/processor 280, transmit processor 264, TX MIMO processor 266, MOD 254, antenna 252, and/or the like) may establish a sidelink unicast link with a remote UE using one or more sidelink signaling messages, as described above.

As further shown in FIG. 18, in some aspects, process 1800 may include relaying a communication, received from the remote UE on a unicast sidelink interface, using one or more RRC messages that are encapsulated in a sidelink signaling message (block 1820). For example, the relay UE (e.g., using controller/processor 280, transmit processor 264, TX MIMO processor 266, MOD 254, antenna 252, and/or the like) may relay a communication, received from the remote UE on a unicast sidelink interface, using one or more RRC messages that are encapsulated in a sidelink signaling message, as described above.

As further shown in FIG. 18, in some aspects, process 1800 may include receiving, from a base station via an RRC message, an access stratum configuration for a unicast sidelink interface between the remote UE and the relay UE (block 1830). For example, the relay UE (e.g., using antenna 252, DEMOD 254, MIMO detector 256, receive processor 258, controller/processor 280, and/or the like) may receive, from a base station via an RRC message, an access stratum configuration for a unicast sidelink interface between the remote UE and the relay UE, as described above.

As further shown in FIG. 18, in some aspects, process 1800 may include modifying the sidelink unicast link between the UE and the relay UE based at least in part on the received access stratum configuration (block 1840). For example, the relay UE (e.g., using controller/processor 280, transmit processor 264, TX MIMO processor 266, MOD 254, antenna 252, and/or the like) may modify the sidelink unicast link between the UE and the relay UE based at least in part on the received access stratum configuration, as described above.

Process 1800 may include additional aspects, such as any single aspect or any combination of aspects described below and/or in connection with one or more other processes described elsewhere herein.

In a first aspect, the remote UE is associated with a sidelink signaling protocol entity (PC5-S) and a sidelink access stratum protocol entity (PC5-RRC).

In a second aspect, alone or in combination with the first aspect, the access stratum configuration includes at least one of a radio bearer configuration information element for the sidelink unicast link, a DRX configuration information element, or a resource allocation information element.

In a third aspect, alone or in combination with one or more of the first and second aspects, the access stratum configuration is received in a sidelink interface configuration information element in an RRC reconfiguration message.

In a fourth aspect, alone or in combination with one or more of the first and third aspects, process 1800 may include receiving, from the base station, a radio resource control (RRC) reconfiguration message directed to the remote UE that is encapsulated in a transparent container; and providing the RRC reconfiguration message in the transparent container to the remote UE, wherein the RRC reconfiguration message is provided in a sidelink interface signaling protocol message directed to the remote UE or in a sidelink interface access stratum protocol message directed to the remote UE.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
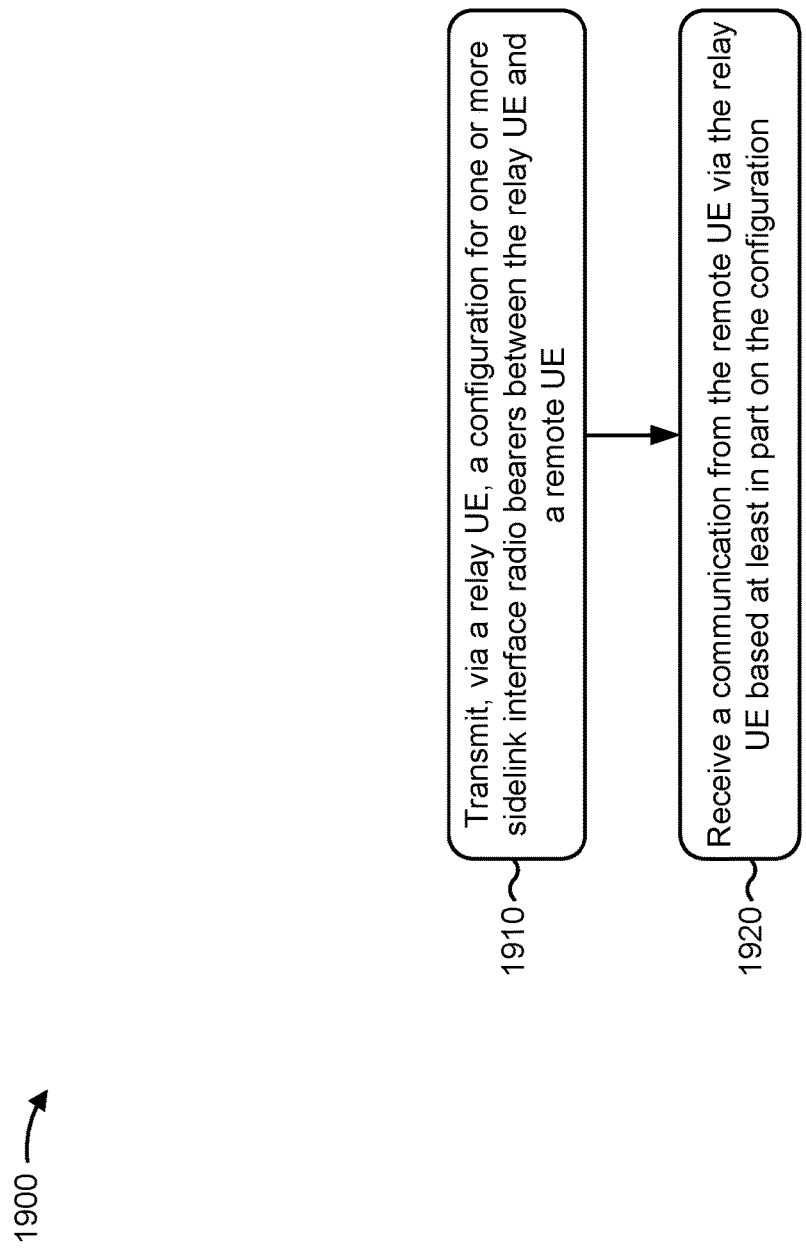
FIG. 19 is a diagram illustrating an example process performed, for example, by a base station, in accordance with various aspects of the present disclosure.

FIG. 19 is a diagram illustrating an example process 1900 performed, for example, by a base station, in accordance with various aspects of the present disclosure. Example process 1900 is an example where the base station (e.g., base station 110, the network, and/or the like) performs operations associated with UE-to-network relaying.

As shown in FIG. 19, in some aspects, process 1900 may include transmitting, via a relay UE, a configuration for one or more sidelink interface radio bearers between the relay UE and a remote UE (block 1910). For example, the base station (e.g., using controller/processor 240, transmit processor 220, TX MIMO processor 230, MOD 232, antenna 234, and/or the like) may transmit, via a relay UE, a configuration for one or more sidelink interface radio bearers between the relay UE and a remote UE, as described above.

As further shown in FIG. 19, in some aspects, process 1900 may include receiving a communication from the remote UE via the relay UE based at least in part on the configuration (block 1920). For example, the base station (e.g., using antenna 234, DEMOD 232, MIMO detector 236, receive processor 238, controller/processor 240, and/or the like) may receive a communication from the remote UE via the relay UE based at least in part on the configuration, as described above.

Process 1900 may include additional aspects, such as any single aspect or any combination of aspects described below and/or in connection with one or more other processes described elsewhere herein.

In a first aspect, the one or more sidelink interface radio bearers comprise one or more signaling radio bearers or one or more data radio bearers for an access stratum connection between the remote UE and the relay UE.

In a second aspect, alone or in combination with the first aspect, the one or more sidelink interface radio bearers are for a sidelink unicast link between the remote UE and the relay UE.

In a third aspect, alone or in combination with one or more of the first and second aspects, the configuration indicates an update to a sidelink unicast link between the UE and the relay UE.

In a fourth aspect, alone or in combination with one or more of the first through third aspects, the configuration is a ProSe Sidelink link configuration transmitted using access stratum signaling.

In a fifth aspect, alone or in combination with one or more of the first through fourth aspects, process 1900 may include transmitting a radio resource control (RRC) reconfiguration message directed to the remote UE that is encapsulated in a transparent container, wherein the RRC reconfiguration message is provided in the transparent container to the remote UE in a sidelink interface signaling protocol message directed to the remote UE or in a sidelink interface access stratum protocol message directed to the remote UE.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
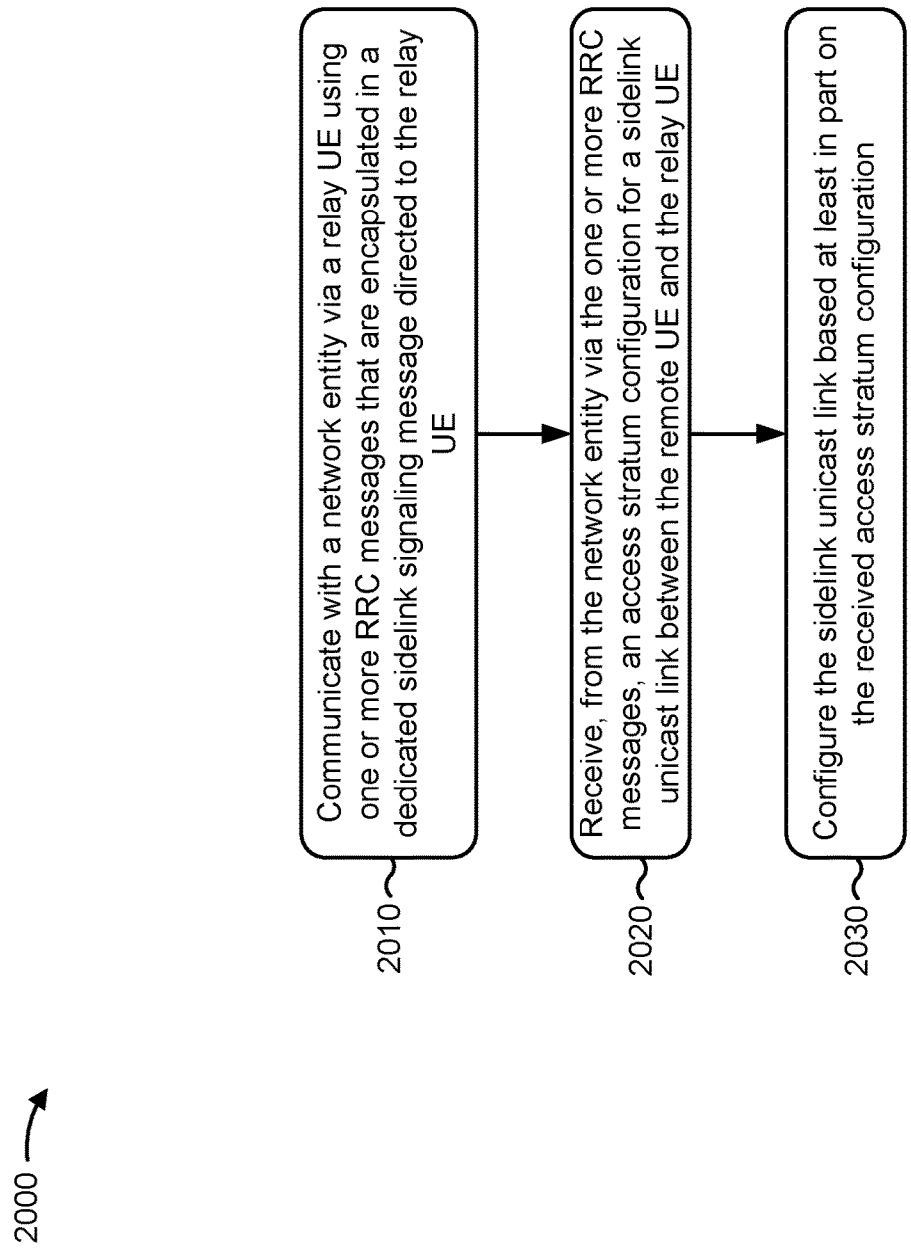
FIGS. 20-21 are diagrams illustrating example processes performed, for example, by a user equipment, in accordance with various aspects of the present disclosure.

FIG. 20 is a diagram illustrating an example process 2000 performed, for example, by a remote UE, in accordance with various aspects of the present disclosure. Example process 2000 is an example where the remote UE (e.g., UE 120) performs operations associated with user equipment-to-network relay.

As shown in FIG. 20, in some aspects, process 2000 may include communicating with a network entity via a relay UE using one or more RRC messages that are encapsulated in a dedicated sidelink signaling message directed to the relay UE (block 2010). For example, the UE (e.g., using controller/processor 280, transmit processor 264, TX MIMO processor 266, MOD 254, antenna 252, and/or the like) may communicate with a network entity via a relay UE using one or more RRC messages that are encapsulated in a dedicated sidelink signaling message directed to the relay UE, as described above.

As further shown in FIG. 20, in some aspects, process 2000 may include receiving, from the network entity via the one or more RRC messages, an access stratum configuration for a sidelink unicast link between the remote UE and the relay UE (block 2020). For example, the UE (e.g., using antenna 252, DEMOD 254, MIMO detector 256, receive processor 258, controller/processor 280, and/or the like) may receive, from the network entity via the one or more RRC messages, an access stratum configuration for a sidelink unicast link between the remote UE and the relay UE, as described above.

As further shown in FIG. 20, in some aspects, process 2000 may include configuring the sidelink unicast link based at least in part on the received access stratum configuration (block 2030). For example, the UE (e.g., using controller/processor 280, transmit processor 264, TX MIMO processor 266, MOD 254, antenna 252, and/or the like) may configure the sidelink unicast link based at least in part on the received access stratum configuration, as described above.

Process 2000 may include additional aspects, such as any single aspect or any combination of aspects described below and/or in connection with one or more other processes described elsewhere herein.

In a first aspect, the dedicated sidelink signaling message is transmitted without sidelink interface security protection.

In a second aspect, alone or in combination with the first aspect, the dedicated sidelink signaling message is transmitted with sidelink interface security protection, and wherein the sidelink interface security protection is configured prior to relaying.

In a third aspect, alone or in combination with one or more of the first and second aspects, the dedicated sidelink signaling message comprises a message associated with a sidelink signaling protocol (PC5-S) entity or a sidelink radio resource control (PC5-RRC) entity.

In a fourth aspect, alone or in combination with one or more of the first through third aspects, configuring the sidelink unicast link further comprises configuring one or more sidelink interface radio bearers in accordance with the access stratum configuration, wherein the one or more sidelink interface radio bearers comprise one or more signaling radio bearers or one or more data radio bearers for a unicast access stratum connection between the remote UE and the relay UE.

In a fifth aspect, alone or in combination with one or more of the first through fourth aspects, process 2000 includes performing communications via the sidelink unicast link.

In a sixth aspect, alone or in combination with one or more of the first through fifth aspects, the communications are unicast communications.

In a seventh aspect, alone or in combination with one or more of the first through sixth aspects, the sidelink unicast link is a PC5-RRC connection.

In an eighth aspect, alone or in combination with one or more of the first through seventh aspects, the dedicated sidelink signaling message is directed to the relay UE based at least in part on a Layer 2 identifier of the relay UE.

In a ninth aspect, alone or in combination with one or more of the first through eighth aspects, the access stratum configuration includes at least one of a radio bearer configuration information element for one or more sidelink interface radio bearers of the sidelink unicast link, a discontinuous reception (DRX) configuration information element, or a resource allocation information element.

In a tenth aspect, alone or in combination with one or more of the first through ninth aspects, the access stratum configuration is received in a sidelink interface configuration information element in an RRC reconfiguration message.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
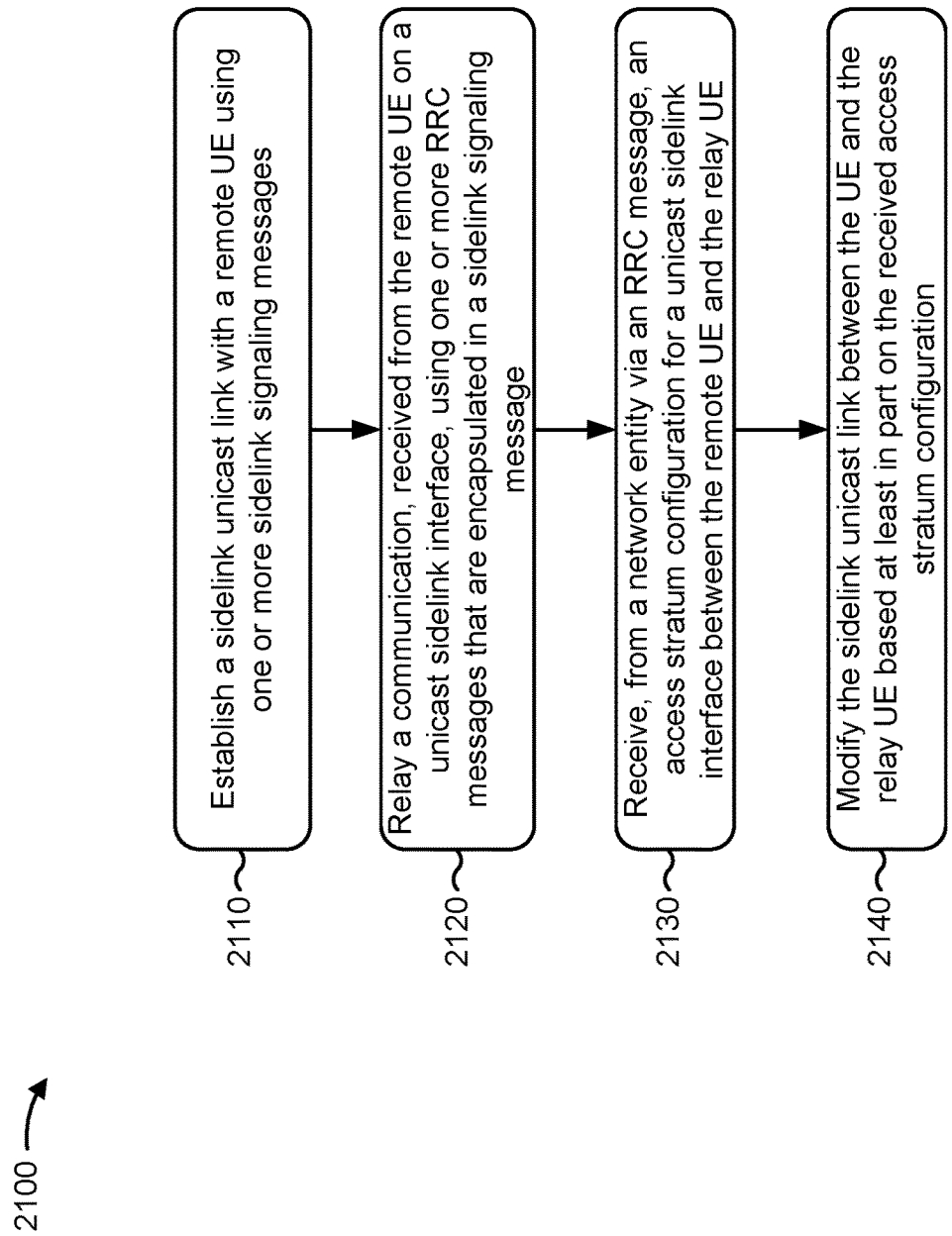

FIG. 21 is a diagram illustrating an example process 2100 performed, for example, by a relay UE, in accordance with various aspects of the present disclosure. Example process 2100 is an example where the relay UE (e.g., UE 120) performs operations associated with user equipment-to-network relay.

As shown in FIG. 21, in some aspects, process 2100 may include establishing a sidelink unicast link with a remote UE using one or more sidelink signaling messages (block 2110). For example, the relay UE (e.g., using controller/processor 280, transmit processor 264, TX MIMO processor 266, MOD 254, antenna 252, and/or the like) may establish a sidelink unicast link with a remote UE using one or more sidelink signaling messages, as described above.

As further shown in FIG. 21, in some aspects, process 2100 may include relaying a communication, received from the remote UE on a unicast sidelink interface, using one or more RRC messages that are encapsulated in a sidelink signaling message (block 2120). For example, the relay UE (e.g., using controller/processor 280, transmit processor 264, TX MIMO processor 266, MOD 254, antenna 252, and/or the like) may relay a communication, received from the remote UE on a unicast sidelink interface, using one or more RRC messages that are encapsulated in a sidelink signaling message, as described above.

As further shown in FIG. 21, in some aspects, process 2100 may include receiving, from a network entity via an RRC message, an access stratum configuration for a unicast sidelink interface between the remote UE and the relay UE (block 2130). For example, the relay UE (e.g., using antenna 252, DEMOD 254, MIMO detector 256, receive processor 258, controller/processor 280, and/or the like) may receive, from a network entity via an RRC message, an access stratum configuration for a unicast sidelink interface between the remote UE and the relay UE, as described above.

As further shown in FIG. 21, in some aspects, process 2100 may include modifying the sidelink unicast link between the UE and the relay UE based at least in part on the received access stratum configuration (block 2140). For example, the relay UE (e.g., using controller/processor 280, transmit processor 264, TX MIMO processor 266, MOD 254, antenna 252, and/or the like) may modify the sidelink unicast link between the UE and the relay UE based at least in part on the received access stratum configuration, as described above.

Process 2100 may include additional aspects, such as any single aspect or any combination of aspects described below and/or in connection with one or more other processes described elsewhere herein.

In a first aspect, process 2100 includes receiving, from the network entity, a radio resource control (RRC) reconfiguration message directed to the remote UE that is encapsulated in a transparent container, and providing the RRC reconfiguration message in the transparent container to the remote UE, wherein the RRC reconfiguration message is provided in a sidelink interface signaling protocol message directed to the remote UE or in a sidelink interface access stratum protocol message directed to the remote UE.

In a second aspect, alone or in combination with the first aspect, the remote UE is associated with a sidelink signaling protocol entity (PC5-S) and a sidelink access stratum protocol entity (PC5-RRC).

In a third aspect, alone or in combination with one or more of the first and second aspects, the access stratum configuration includes at least one of a radio bearer configuration information element for the sidelink unicast link, a discontinuous reception (DRX) configuration information element, or a resource allocation information element.

In a fourth aspect, alone or in combination with one or more of the first through third aspects, the access stratum configuration is received in a sidelink interface configuration information element in an RRC reconfiguration message.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
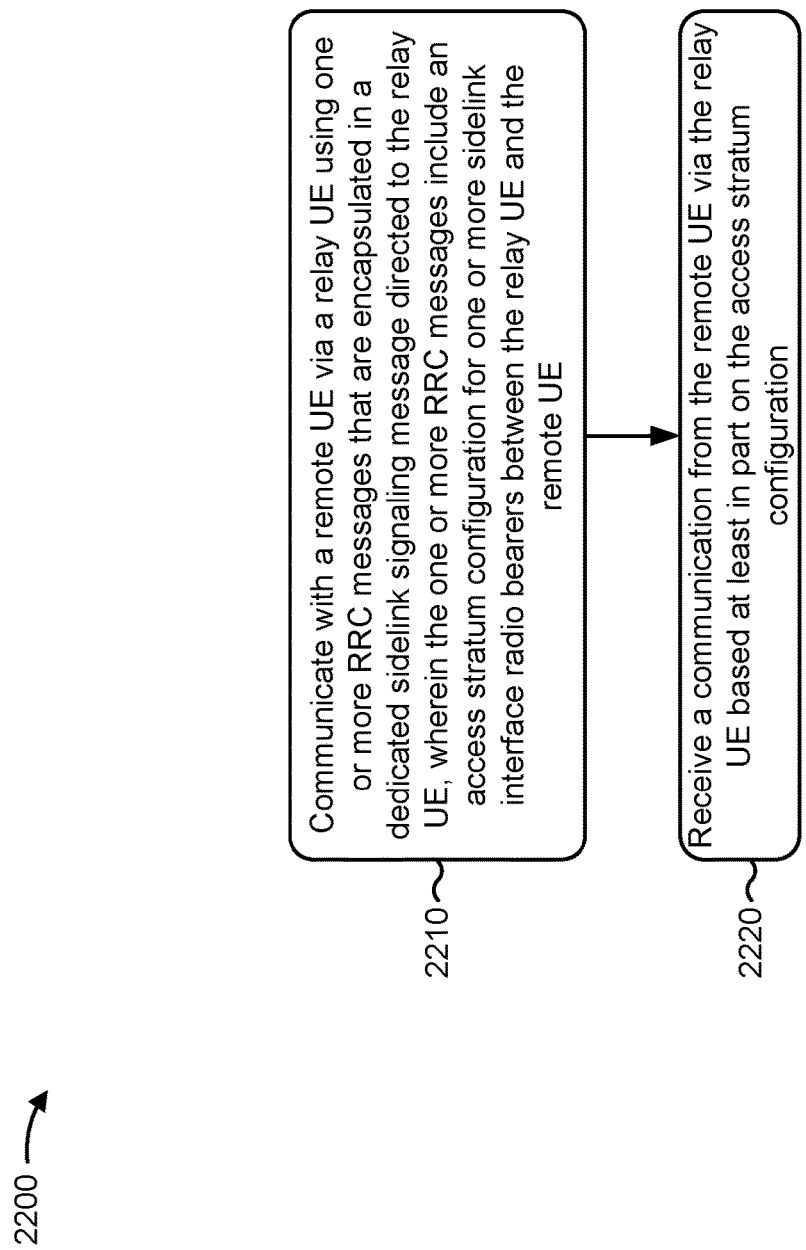
FIG. 22 is a diagram illustrating an example process performed, for example, by a base station, in accordance with various aspects of the present disclosure.

FIG. 22 is a diagram illustrating an example process 2200 performed, for example, by a network entity, in accordance with various aspects of the present disclosure. Example process 2200 is an example where the network entity (e.g., BS 110) performs operations associated with user equipment-to-network relay.

As shown in FIG. 22, in some aspects, process 2200 may include communicating with a remote UE via a relay UE using one or more RRC messages that are encapsulated in a dedicated sidelink signaling message directed to the relay UE, wherein the one or more RRC messages include an access stratum configuration for one or more sidelink interface radio bearers between the relay UE and the remote UE (block 2210). For example, the network entity (e.g., using controller/processor 240, transmit processor 220, TX MIMO processor 230, MOD 232, antenna 234, and/or the like) may communicate with a remote UE via a relay UE using one or more RRC messages that are encapsulated in a dedicated sidelink signaling message directed to the relay UE, wherein the one or more RRC messages include an access stratum configuration for one or more sidelink interface radio bearers between the relay UE and the remote UE, as described above.

As further shown in FIG. 22, in some aspects, process 2200 may include receiving a communication from the remote UE via the relay UE based at least in part on the access stratum configuration (block 2220). For example, the network entity (e.g., using antenna 234, DEMOD 232, MIMO detector 236, receive processor 238, controller/processor 240, memory 242, and/or the like) may receive a communication from the remote UE via the relay UE based at least in part on the access stratum configuration, as described above.

Process 2200 may include additional aspects, such as any single aspect or any combination of aspects described below and/or in connection with one or more other processes described elsewhere herein.

In a first aspect, the one or more sidelink interface radio bearers comprise one or more signaling radio bearers or one or more data radio bearers for an access stratum connection between the remote UE and the relay UE.

In a second aspect, alone or in combination with the first aspect, the one or more sidelink interface radio bearers are for a sidelink unicast link between the remote UE and the relay UE.

In a third aspect, alone or in combination with one or more of the first and second aspects, the access stratum configuration indicates an update to a sidelink unicast link between the UE and the relay UE.

In a fourth aspect, alone or in combination with one or more of the first through third aspects, the access stratum configuration is a ProSe Sidelink link configuration transmitted using access stratum signaling.

In a fifth aspect, alone or in combination with one or more of the first through fourth aspects, the one or more RRC messages include an RRC reconfiguration message directed to the remote UE that is encapsulated in a transparent container, wherein the RRC reconfiguration message is provided in the transparent container to the remote UE in a sidelink interface signaling protocol message directed to the remote UE or in a sidelink interface access stratum protocol message directed to the remote UE.

Although FIG. 22 shows example blocks of process 2200, in some aspects, process 2200 may include additional blocks, fewer blocks, different blocks, or differently arranged blocks than those depicted in FIG. 22. Additionally, or alternatively, two or more of the blocks of process 2200 may be performed in parallel.

The following provides an overview of some aspects of the present disclosure:

Aspect 1: A method of wireless communication performed by a remote user equipment (UE), comprising: communicating with a network entity via a relay UE using one or more radio resource control (RRC) messages that are encapsulated in a dedicated sidelink signaling message directed to the relay UE; receiving, from the network entity via the one or more RRC messages, an access stratum configuration for a sidelink unicast link between the remote UE and the relay UE; and configuring the sidelink unicast link based at least in part on the received access stratum configuration.

Aspect 2: The method of aspect 1, wherein the dedicated sidelink signaling message is transmitted without sidelink interface security protection.

Aspect 3: The method of any of aspects 1-2, wherein the dedicated sidelink signaling message is transmitted with sidelink interface security protection, and wherein the sidelink interface security protection is configured prior to relaying.

Aspect 4: The method of any of aspects 1-3, wherein the dedicated sidelink signaling message comprises a message associated with a sidelink signaling protocol (PC5-S) entity or a sidelink radio resource control (PC5-RRC) entity.

Aspect 5: The method of any of aspects 1-4, wherein configuring the sidelink unicast link further comprises: configuring one or more sidelink interface radio bearers in accordance with the access stratum configuration, wherein the one or more sidelink interface radio bearers comprise one or more signaling radio bearers or one or more data radio bearers for a unicast access stratum connection between the remote UE and the relay UE.

Aspect 6: The method of any of aspects 1-5, further comprising: performing communications via the sidelink unicast link.

Aspect 7: The method of aspect 6, wherein the communications are unicast communications.

Aspect 8: The method of any of aspects 1-7, wherein the sidelink unicast link is a PC5-RRC connection.

Aspect 9: The method of any of aspects 1-8, wherein the dedicated sidelink signaling message is directed to the relay UE based at least in part on a Layer 2 identifier of the relay UE.

Aspect 10: The method of any of aspects 1-9, wherein the access stratum configuration includes at least one of a radio bearer configuration information element for one or more sidelink interface radio bearers of the sidelink unicast link, a discontinuous reception (DRX) configuration information element, or a resource allocation information element.

Aspect 11: The method of aspect 10, wherein the access stratum configuration is received in a sidelink interface configuration information element in an RRC reconfiguration message.

Aspect 12: A method of wireless communication performed by a relay user equipment (UE), comprising: establishing a sidelink unicast link with a remote UE using one or more sidelink signaling messages; relaying a communication, received from the remote UE on a unicast sidelink interface, using one or more radio resource control (RRC) messages that are encapsulated in a sidelink signaling message; receiving, from a network entity via an RRC message, an access stratum configuration for a unicast sidelink interface between the remote UE and the relay UE; and modifying the sidelink unicast link between the UE and the relay UE based at least in part on the received access stratum configuration.

Aspect 13: The method of aspect 12, further comprising: receiving, from the network entity, a radio resource control (RRC) reconfiguration message directed to the remote UE that is encapsulated in a transparent container; and providing the RRC reconfiguration message in the transparent container to the remote UE, wherein the RRC reconfiguration message is provided in a sidelink interface signaling protocol message directed to the remote UE or in a sidelink interface access stratum protocol message directed to the remote UE.

Aspect 14: The method of any of aspects 12-13, wherein the remote UE is associated with a sidelink signaling protocol entity (PC5-S) and a sidelink access stratum protocol entity (PC5-RRC).

Aspect 15: The method of any of aspects 12-14, wherein the access stratum configuration includes at least one of a radio bearer configuration information element for the sidelink unicast link, a discontinuous reception (DRX) configuration information element, or a resource allocation information element.

Aspect 16: The method of any of aspects 12-15, wherein the access stratum configuration is received in a sidelink interface configuration information element in an RRC reconfiguration message.

Aspect 17: A method of wireless communication performed by a network entity, comprising: communicating with a remote user equipment (UE) via a relay UE using one or more radio resource control (RRC) messages that are encapsulated in a dedicated sidelink signaling message directed to the relay UE, wherein the one or more RRC messages include an access stratum configuration for one or more sidelink interface radio bearers between the relay UE and the remote UE; and receiving a communication from the remote UE via the relay UE based at least in part on the access stratum configuration.

Aspect 18: The method of aspect 17, wherein the one or more sidelink interface radio bearers comprise one or more signaling radio bearers or one or more data radio bearers for an access stratum connection between the remote UE and the relay UE.

Aspect 19: The method of any of aspects 17-18, wherein the one or more sidelink interface radio bearers are for a sidelink unicast link between the remote UE and the relay UE.

Aspect 20: The method of any of aspects 17-19, wherein the access stratum configuration indicates an update to a sidelink unicast link between the UE and the relay UE.

Aspect 21: The method of any of aspects 17-20, wherein the access stratum configuration is a ProSe Sidelink link configuration transmitted using access stratum signaling.

Aspect 22: The method of any of aspects 17-21, wherein the one or more RRC messages include an RRC reconfiguration message directed to the remote UE that is encapsulated in a transparent container, wherein the RRC reconfiguration message is provided in the transparent container to the remote UE in a sidelink interface signaling protocol message directed to the remote UE or in a sidelink interface access stratum protocol message directed to the remote UE.

Aspect 23: An apparatus for wireless communication at a device, comprising a processor; memory coupled with the processor; and instructions stored in the memory and executable by the processor to cause the apparatus to perform the method of one or more aspects of aspects 1-22.

Aspect 24: A device for wireless communication, comprising a memory and one or more processors coupled to the memory, the memory and the one or more processors configured to perform the method of one or more aspects of aspects 1-22.

Aspect 25: An apparatus for wireless communication, comprising at least one means for performing the method of one or more aspects of aspects 1-22.

Aspect 26: A non-transitory computer-readable medium storing code for wireless communication, the code comprising instructions executable by a processor to perform the method of one or more aspects of aspects 1-22.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a remote user equipment (UE), comprising:
communicating with a network entity via a relay UE using one or more radio resource control (RRC) messages that are encapsulated in a dedicated sidelink signaling message directed to the relay UE, wherein the dedicated sidelink signaling message comprises a message associated with a sidelink radio resource control (PC5-RRC) entity;
receiving, from the network entity via the one or more RRC messages, an access stratum configuration for a sidelink unicast link between the remote UE and the relay UE; and configuring the sidelink unicast link based at least in part on the received access stratum configuration.

2. The method of claim 1, wherein the dedicated sidelink signaling message is transmitted without sidelink interface security protection.

3. The method of claim 1, wherein the dedicated sidelink signaling message is transmitted with sidelink interface security protection, and wherein the sidelink interface security protection is configured prior to relaying.

4. The method of claim 1, wherein configuring the sidelink unicast link further comprises:
configuring one or more sidelink interface radio bearers in accordance with the access stratum configuration, wherein the one or more sidelink interface radio bearers comprise one or more signaling radio bearers or one or more data radio bearers for a unicast access stratum connection between the remote UE and the relay UE.

5. The method of claim 1, further comprising:
performing communications via the sidelink unicast link.

6. The method of claim 5, wherein the communications are unicast communications.

7. The method of claim 1, wherein the sidelink unicast link is a PC5-RRC connection.

8. The method of claim 1, wherein the dedicated sidelink signaling message is directed to the relay UE based at least in part on a Layer 2 identifier of the relay UE.

9. The method of claim 1, wherein the access stratum configuration includes at least one of a radio bearer configuration information element for one or more sidelink interface radio bearers of the sidelink unicast link, a discontinuous reception (DRX) configuration information element, or a resource allocation information element.

10. The method of claim 9, wherein the access stratum configuration is received in a sidelink interface configuration information element in an RRC reconfiguration message.

11. The method of claim 1, wherein the remote UE is associated with the PC5-RRC entity.

12. A method of wireless communication performed by a relay user equipment (UE), comprising:
establishing a sidelink unicast link with a remote UE using one or more sidelink signaling messages;
relaying a communication, received from the remote UE on a unicast sidelink interface, using one or more radio resource control (RRC) messages that are encapsulated in a sidelink signaling message, the sidelink signaling message comprising a message associated with a sidelink radio resource control (PC5-RRC) entity;
receiving, from a network entity via an RRC message, an access stratum configuration for a unicast sidelink interface between the remote UE and the relay UE; and
modifying the sidelink unicast link between the UE and the relay UE based at least in part on the received access stratum configuration.

13. The method of claim 12, further comprising:
receiving, from the network entity, a radio resource control (RRC) reconfiguration message directed to the remote UE that is encapsulated in a transparent container; and
providing the RRC reconfiguration message in the transparent container to the remote UE,
wherein the RRC reconfiguration message is provided in a sidelink interface signaling protocol message directed to the remote UE or in a sidelink interface access stratum protocol message directed to the remote UE.

14. The method of claim 12, wherein the access stratum configuration includes at least one of a radio bearer configuration information element for the sidelink unicast link, a discontinuous reception (DRX) configuration information element, or a resource allocation information element.

15. The method of claim 12, wherein the access stratum configuration is received in a sidelink interface configuration information element in an RRC reconfiguration message.

16. The method of claim 12, wherein the relay UE is associated with the PC5-RRC entity.

17. A method of wireless communication performed by a network entity, comprising:
communicating with a remote user equipment (UE) via a relay UE using one or more radio resource control (RRC) messages that are encapsulated in a dedicated sidelink signaling message directed to the relay UE, wherein the dedicated sidelink signaling message comprises a message associated with a sidelink radio resource control (PC5-RRC) entity, and wherein the one or more RRC messages include an access stratum configuration for one or more sidelink interface radio bearers between the relay UE and the remote UE; and
receiving a communication from the remote UE via the relay UE based at least in part on the access stratum configuration.

18. The method of claim 17, wherein the one or more sidelink interface radio bearers comprise one or more signaling radio bearers or one or more data radio bearers for an access stratum connection between the remote UE and the relay UE.

19. The method of claim 17, wherein the one or more sidelink interface radio bearers are for a sidelink unicast link between the remote UE and the relay UE.

20. The method of claim 17, wherein the access stratum configuration indicates an update to a sidelink unicast link between the UE and the relay UE.

21. The method of claim 17, wherein the access stratum configuration is a ProSe Sidelink link configuration transmitted using access stratum signaling.

22. The method of claim 17, wherein the one or more RRC messages include an RRC reconfiguration message directed to the remote UE that is encapsulated in a transparent container, wherein the RRC reconfiguration message is provided in the transparent container to the remote UE in a sidelink interface signaling protocol message directed to the remote UE or in a sidelink interface access stratum protocol message directed to the remote UE.

23. A remote user equipment (UE), comprising:
a memory; and
one or more processors coupled to the memory, the one or more processors configured to:
communicate with a network entity via a relay UE using one or more radio resource control (RRC) messages that are encapsulated in a dedicated sidelink signaling message directed to the relay UE, wherein the dedicated sidelink signaling message comprises a message associated with a sidelink radio resource control (PC5-RRC) entity;
receive, from the network entity via the one or more RRC messages, an access stratum configuration for a sidelink unicast link between the remote UE and the relay UE; and
configure the sidelink unicast link based at least in part on the received access stratum configuration.

24. The remote UE of claim 23, wherein the dedicated sidelink signaling message is transmitted without sidelink interface security protection.

25. The remote UE of claim 23, wherein the dedicated sidelink signaling message is transmitted with sidelink interface security protection, and wherein the sidelink interface security protection is configured prior to relaying.

26. The remote UE of claim 23, wherein the one or more processors, when configuring the sidelink unicast link, are configured to:
    configure one or more sidelink interface radio bearers in accordance with the access stratum configuration, wherein the one or more sidelink interface radio bearers comprise one or more signaling radio bearers or one or more data radio bearers for a unicast access stratum connection between the remote UE and the relay UE.

27. The remote UE of claim 23, wherein the one or more processors are configured to:
    perform communications via the sidelink unicast link.

28. The remote UE of claim 27, wherein the communications are unicast communications.

29. The remote UE of claim 23, wherein the sidelink unicast link is a PC5-RRC connection.

30. The remote UE of claim 23, wherein the remote UE is associated with the PC5-RRC entity.

* * * * *